(12) United States Patent
Nogami et al.

(10) Patent No.: US 9,398,580 B2
(45) Date of Patent: Jul. 19, 2016

(54) TERMINAL, BASE STATION, COMMUNICATIONS SYSTEM, AND COMMUNICATIONS METHOD

(71) Applicant: SHARP KABUSHIKI KAISHA, Osaka-shi, Osaka (JP)

(72) Inventors: Toshizo Nogami, Osaka (JP); Kazuyuki Shimezawa, Osaka (JP); Kimihiko Imamura, Osaka (JP); Daiichiro Nakashima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 22 days.

(21) Appl. No.: 14/356,028

(22) PCT Filed: Nov. 2, 2012

(86) PCT No.: PCT/JP2012/078416
§ 371 (c)(1),
(2) Date: May 2, 2014

(87) PCT Pub. No.: WO2013/069550
PCT Pub. Date: May 16, 2013

(65) Prior Publication Data
US 2014/0348095 A1   Nov. 27, 2014

(30) Foreign Application Priority Data
Nov. 7, 2011   (JP) .................................. 2011-242964

(51) Int. Cl.
*H04W 4/00*   (2009.01)
*H04W 72/04*   (2009.01)
(Continued)

(52) U.S. Cl.
CPC ............... *H04W 72/042* (2013.01); *H04B 7/06* (2013.01); *H04B 7/08* (2013.01); *H04L 5/0053* (2013.01); *H04L 5/0007* (2013.01)

(58) Field of Classification Search
None
See application file for complete search history.

(56) References Cited

U.S. PATENT DOCUMENTS

2009/0268624 A1* 10/2009 Imamura ............... H04W 48/08
370/252
2010/0202377 A1   8/2010 Nishio et al.
(Continued)

FOREIGN PATENT DOCUMENTS

JP        2011-45120 A       3/2011
WO   WO 2010/076300 A1   7/2010

OTHER PUBLICATIONS

"3rd Generation Partnership Project; Technical Specification Group Radio Access Network; Evolved Universal Terrestrial Radio Access (E-UTRA); Physical Channels and Modulation(Release 10)", 3GPP TS 36.211 V10.2.0 (Jun. 2011), pp. 1-103.

(Continued)

*Primary Examiner* — Edan Orgad
*Assistant Examiner* — Rebecca Song
(74) *Attorney, Agent, or Firm* — Birch, Stewart, Kolasch & Birch, LLP

(57) ABSTRACT

There are provided a base station, a terminal, a communications system, and a communications method which enable efficient transmission and reception of transmission data even in the case where the base station notifies the terminal of control information via an enhanced physical downlink control channel.
A terminal configured to perform communication with a base station monitors a physical downlink control channel mapped to a physical downlink control channel region, and acquires higher-layer control information indicating a plurality of enhanced physical downlink control channel regions different from the physical downlink control channel region. In the case where the terminal has acquired the higher-layer control information, the terminal monitors an enhanced physical downlink control channel mapped to at least one region from among the plurality of enhanced physical downlink control channel regions, in place of the physical downlink control channel mapped to the physical downlink control channel region.

10 Claims, 15 Drawing Sheets

(51) Int. Cl.
  *H04B 7/06* (2006.01)
  *H04B 7/08* (2006.01)
  *H04L 5/00* (2006.01)

(56) References Cited

U.S. PATENT DOCUMENTS

2013/0039284 A1* 2/2013 Marinier ............... H04L 5/001
  370/329
2014/0044062 A1* 2/2014 Ye ....................... H04W 72/0453
  370/329

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP.TS 36.213 V10.2.0 (Jun. 2011), pp. 1-120.

LG-Ericsson, "Consideration on E-PDCCH multiplexing and signalling", [online] 3GPP TSG RAN WG1 #66bis, R1-113372, Oct. 10-14, 2011, pp. 1-3.

Panasonic, "R-PDCCH Placement," 3GPP TSG RAN WG1 Meeting #60bis, R1-102042, Beijing, China, Apr. 12-16, 2010 (retrieved Apr. 6, 2010), pp. 1-5, XP-50419373.

Samsung, "Discussion on ePDCCH Design Issues," 3GPP TSG-RAN1#66 meeting, R1-112517, Athens, Greece, Aug. 22-26, 2011 (retrieved Aug. 16, 2011), pp. 1-4, XP-50537597.

ZTE, "The Mapping Schemes of R-PDCCH," TSG-RAN WG1 #61, R1-102915, Montreal, Canada, May 10-14, 2010 (retrieved May 4, 2010), 5 pages, XP-50420046A.

* cited by examiner

TERMINAL, BASE STATION, COMMUNICATIONS SYSTEM, AND COMMUNICATIONS METHOD

TECHNICAL FIELD

The present invention relates to a terminal, a base station, a communications system, and a communications method.

Priority is claimed on Japanese Patent Application No. 2011-242964, filed Nov. 7, 2011, the content of which is incorporated herein by reference.

BACKGROUND ART

In wireless communications systems, such as ones based on LTE (Long Term Evolution) and LTE-A (LTE-Advanced) by 3GPP (Third Generation Partnership Project) and Wireless LAN and WiMAX (Worldwide Interoperability for Microwave Access) by IEEE (The Institute of Electrical and Electronics engineers), a base station (base station device, downlink transmission device, uplink reception device, eNodeB) and a terminal (terminal device, mobile station device, downlink reception device, uplink transmission device, UE) each include multiple transmit and receive antennas and use the MIMO (Multi input Multi Output) technology to spatially multiplex data signals, thereby realizing high-speed data communication. In particular, LTE and LTE-A use OFDM (Orthogonal Frequency Division Multiplexing) in the downlink so as to realize high spectral efficiency and use SC-FDMA (Single Carrier-Frequency Division Multiple Access) in the uplink so as to suppress peak power.

FIG. 18 is a diagram illustrating the configuration of an LTE-based communications system. In FIG. 18, a base station 1801 notifies a terminal 1802 of control information about downlink transmission data 1804 via a physical downlink control channel (PDCCH) 1803. The terminal 1802 first performs detection of the control information. If the terminal 1802 has detected the control information, the terminal 1802 extracts the downlink transmission data 1804 using the detected control information. This downlink transmission data may be transmission data intended for the terminal 1802 or may be transmission data common to a plurality of terminals, such as paging or system information (NPL 1 and NPL 2).

CITATION LIST

Non-Patent Document

NPL 1: 3rd Generation Partnership Project; Technical Specification Group Radio Access Network; Evolved Universal Terrestrial Radio Access (E-UTRA); Physical Channels and Modulation (Release 10), June 2011, 3GPP TS 36.211 V10.2.0 (2011-06).

NPL 2: 3rd Generation Partnership Project; Technical Specification Group Radio Access Network; Evolved Universal Terrestrial Radio Access (E-UTRA): Physical layer procedures (Release 10), June 2010, 3GPP TS 36.213 V10.2.0 (2011-6).

DISCLOSURE OF THE INVENTION

Problems to be Solved by the Invention

However, in order to increase the number of terminals that can be served in one base station, the use of an enhanced physical downlink control channel as well as a physical downlink control channel is conceivable. For this reason, transmission data intended for individual terminals cannot be efficiently mapped and common transmission data, particularly, broadcast information, cannot be specified for a plurality of terminals with conventional methods. This can be factors that prevent improvement in transmission efficiency.

The present invention has been made in view of the issues described above, and an object thereof is to provide a base station, a terminal, a communications system, and a communications method that enable, in a wireless communications system in which a base station and terminals communicate with each other, transmission data intended for each terminal or transmission data common to a plurality of terminals to be efficiently specified even in the case where the base station notifies the terminals of control information not only via the physical downlink control channel but also via the enhanced physical downlink control channel.

Means for Solving the Problems (1) This invention has been made to overcome the above-described issues, and a terminal according to one embodiment of the present invention is a terminal configured to perform communication with a base station, and including a higher-layer control information acquisition unit configured to acquire first control information indicating a first enhanced physical downlink control channel region and second control information indicating a second enhanced physical downlink control channel region, wherein the first control information includes information which specifies some resource blocks within a frequency band as the first enhanced physical downlink control channel region, and information which indicates whether transmission of an enhanced physical downlink control channel in the first enhanced physical downlink control channel region is localized transmission or distributed transmission, and the second control information includes information which specifies some resource blocks within a frequency band as the second enhanced physical downlink control channel region, and information which indicates whether transmission of an enhanced physical downlink control channel in the second enhanced physical downlink control channel region is localized transmission or distributed transmission.

(2) Also, a terminal according to one embodiment of the present invention is the terminal described above, wherein the first enhanced physical downlink control channel region and the second enhanced physical downlink control channel region each include one or more search spaces.

(3) Also, a terminal according to one embodiment of the present invention is a terminal configured to perform communication with a base station, and including a downlink control channel detection unit configured to monitor a physical downlink control channel mapped to a physical downlink control channel region; and a higher-layer control information acquisition unit configured to acquire higher-layer control information which indicates a plurality of enhanced physical downlink control channel regions different from the physical downlink control channel region, wherein in a case where the higher-layer control information acquisition unit has acquired the higher-layer control information, the downlink control channel detection unit monitors, in place of the physical downlink control channel mapped to the physical downlink control channel region, the enhanced physical downlink control channel mapped to the plurality of enhanced physical downlink control channel regions.

(4) Also, a terminal according to one embodiment of the present invention is the terminal described above, wherein whether or not the enhanced physical downlink control channel is mapped to the plurality of enhanced physical downlink control channel regions in a distributed manner is set independently for each of the plurality of enhanced physical downlink control channel regions.

(5) Also, a terminal according to one embodiment of the present invention is the terminal described above, wherein the enhanced physical downlink control channel is mapped to the plurality of enhanced physical downlink control channel regions in a distributed manner for at least one region from among the plurality of enhanced physical downlink control channel regions.

(6) Also, a terminal according to one embodiment of the present invention is a terminal configured to perform communication with a base station, and including a downlink control channel detection unit configured to monitor a physical downlink control channel mapped to a physical downlink control channel region; and a higher-layer control information acquisition unit configured to acquire higher-layer control information indicating a plurality of enhanced physical downlink control channel regions different from the physical downlink control channel region, wherein in a case where the higher-layer control information acquisition unit has acquired the higher-layer control information, the downlink control channel detection unit monitors, in place of the physical downlink control channel mapped to the physical downlink control channel region, an enhanced physical downlink control channel mapped to at least one region from among the plurality of enhanced physical downlink control channel regions.

(7) Also, a terminal according to one embodiment of the present invention is the terminal described above, wherein the physical downlink control channel and the enhanced physical downlink control channel indicate transmission of broadcast information.

(8) Also, a terminal according to one embodiment of the present invention is the terminal described above, wherein the broadcast information is paging information.

(9) Also, a terminal according to one embodiment of the present invention is the terminal described above, wherein the broadcast information is system information.

(10) Also, a terminal according to one embodiment of the present invention is the terminal described above, wherein in a case where the higher-layer control information acquisition unit has acquired the higher-layer control information, the downlink control channel detection unit monitors, in place of the physical downlink control channel mapped to the physical downlink control channel region, the enhanced physical downlink control channel in an enhanced physical downlink control channel region to which the enhanced physical downlink control channel is mapped in a distributed manner among the plurality of enhanced physical downlink control channel regions.

(11) Also, a base station according to one embodiment of the present invention is a base station configured to perform communication with a terminal, and including a downlink control channel transmission unit configured to transmit a physical downlink control channel mapped to a physical downlink control channel region; and a higher-layer control information notification unit configured to notify the terminal of higher-layer control information indicating a plurality of enhanced physical downlink control channel regions different from the physical downlink control channel region, wherein in a case where the higher-layer control information notification unit has notified the terminal of the higher-layer control information, the downlink control channel transmission unit transmits an enhanced physical downlink control channel mapped to at least one region from among the plurality of enhanced physical downlink control channel regions.

(12) Also, a base station according to one embodiment of the present invention is a base station configured to perform communication with a terminal, and including a downlink control channel transmission unit configured to transmit a physical downlink control channel mapped to a physical downlink control channel region; and a higher-layer control information notification unit configured to notify the terminal of higher-layer control information indicating a plurality of enhanced physical downlink control channel regions different from the physical downlink control channel region, wherein in a case where the higher-layer control information notification unit has notified the terminal of the higher-layer control information, the downlink control channel transmission unit transmits the physical downlink control channel and an enhanced physical downlink control channel mapped to at least one region from among the plurality of enhanced physical downlink control channel regions.

(13) Also, a base station according to one embodiment of the present invention is the base station described above, wherein the physical downlink control channel and the enhanced physical downlink control channel indicate transmission of broadcast information.

(14) Also, a communications system according to one embodiment of the present invention is a communications system in which communication is performed between a base station and a terminal, the base station including a downlink control channel transmission unit configured to transmit a physical downlink control channel mapped to a physical downlink control channel region, and a higher-layer control information notification unit configured to notify the terminal of higher-layer control information indicating a plurality of enhanced physical downlink control channel regions different from the physical downlink control channel region, wherein in a case where the higher-layer control information notification unit has notified the terminal of the higher-layer control information, the downlink control channel transmission unit transmits an enhanced physical downlink control channel mapped to at least one region from among the plurality of enhanced physical downlink control channel regions, and the terminal including a downlink control channel detection unit configured to monitor the physical downlink control channel, and a higher-layer control information acquisition unit configured to acquire the higher-layer control information, wherein in a case where the higher-layer control information acquisition unit has acquired the higher-layer control information, the downlink control channel detection unit monitors, in place of the physical downlink control channel mapped to the physical downlink control channel region, the enhanced physical downlink control channel mapped to the at least one region from among the plurality of enhanced physical downlink control channel regions.

(15) Also, a communications method according to one embodiment of the present invention is a communications method for a terminal configured to perform communication with a base station, and including a step of monitoring a physical downlink control channel mapped to a physical downlink control channel region; a step of acquiring higher-layer control information indicating a plurality of enhanced physical downlink control channel regions different from the physical downlink control channel region; and a step of monitoring, in a case where the higher-layer control information has been acquired, an enhanced physical downlink control channel mapped to at least one region from among the plurality of enhanced physical downlink control channel regions, in place of the physical downlink control channel mapped to the physical downlink control channel region.

(16) Also, a communications method according to one embodiment of the present invention is a communications method for a base station configured to perform communication with a terminal, and including a step of transmitting a physical downlink control channel mapped to a physical downlink control channel region; a step of notifying the terminal of higher-layer control information indicating a plurality of enhanced physical downlink control channel regions different from the physical downlink control channel region; and a step of transmitting, in a case where the base station has notified the terminal of the higher-layer control information, an enhanced physical downlink control channel mapped to at least one region from among the plurality of enhanced physical downlink control channel regions.

Effects of the Invention

According to the present invention, in a wireless communications system in which a base station and a terminal communicate with each other, physical uplink control channel resources can be efficiently specified even in a case where the base station notifies the terminal of control information not only via the physical downlink control channel but also via the enhanced physical downlink control channel.

BEST MODE FOR CARRYING OUT THE INVENTION

First Embodiment

A first embodiment of the present invention will be described below. A communications system according to the first embodiment includes a base station (base station device, downlink transmission device, uplink reception device, eNodeB) and a terminal (terminal device, mobile station device, downlink reception device, uplink transmission device, UE).

Figure 1:
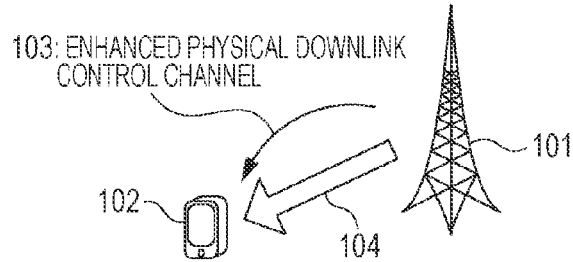
FIG. 1 is a diagram illustrating an example of the configuration of a communications system according to a first embodiment of the present invention.

FIG. 1 is a diagram illustrating an example of the configuration of the communications system according to the first embodiment. In FIG. 1, a base station 101 notifies a terminal 102 of control information about downlink transmission data 104 via a PDCCH and/or an enhanced physical downlink control channel (E-PDCCH: Enhanced-PDCCH) 103. The terminal 102 first performs detection of the control information. If the terminal 102 has detected the control information, the terminal 102 extracts the downlink transmission data 104 by using the detected control information. This downlink transmission data may be transmission data (dedicated information) intended for the terminal 102 or may be transmission data (broadcast information) common to a plurality of terminals, such as paging or system information.

A control channel that indicates transmission data is masked with an RNTI (Radio Network Temporary Identities), which is an identifier specified by the base station 101 in advance. Specifically, in the case where a control channel of interest is an enhanced physical downlink control channel (first enhanced physical downlink control channel) that indicates transmission data intended for the terminal 102, a bit sequence representing an RNTI (such as C-RNTI (Cell-RNTI) or SPS C-RNTI (Semi Persistent Scheduling C-RNTI)) assigned to the terminal 102 is used as CRC (Cyclic Redundancy Check) check bits (CRC bits, CRC check bits). This configuration thus allows only the terminal 102 to read transmission data intended for the terminal 102. Also, in the case where a control channel of interest represents transmission data common to a plurality of terminals, the control channel is masked with an RNTI for common transmission data. Specifically, bit sequences representing a P-RNTI (Paging-PNTI), an SI-RNTI (System Information-RNTI), and an RA-RNTI (Random Access-RNTI) are used as CRC check bits for enhanced physical downlink control channels (second enhanced physical downlink control channels) indicating paging, system information, and a random access response, respectively. Each terminal 102 is notified of identifiers specific to the terminal, such as the C-RNTI and the SPS C-RNTI, in advance by the base station 101. Identifiers for broadcast information, such as the P-RNTI and the SI-RNTI, are set in common or are fixed. This configuration thus allows each terminal 102 to read the same paging, system information, and random access response.

Figure 2:
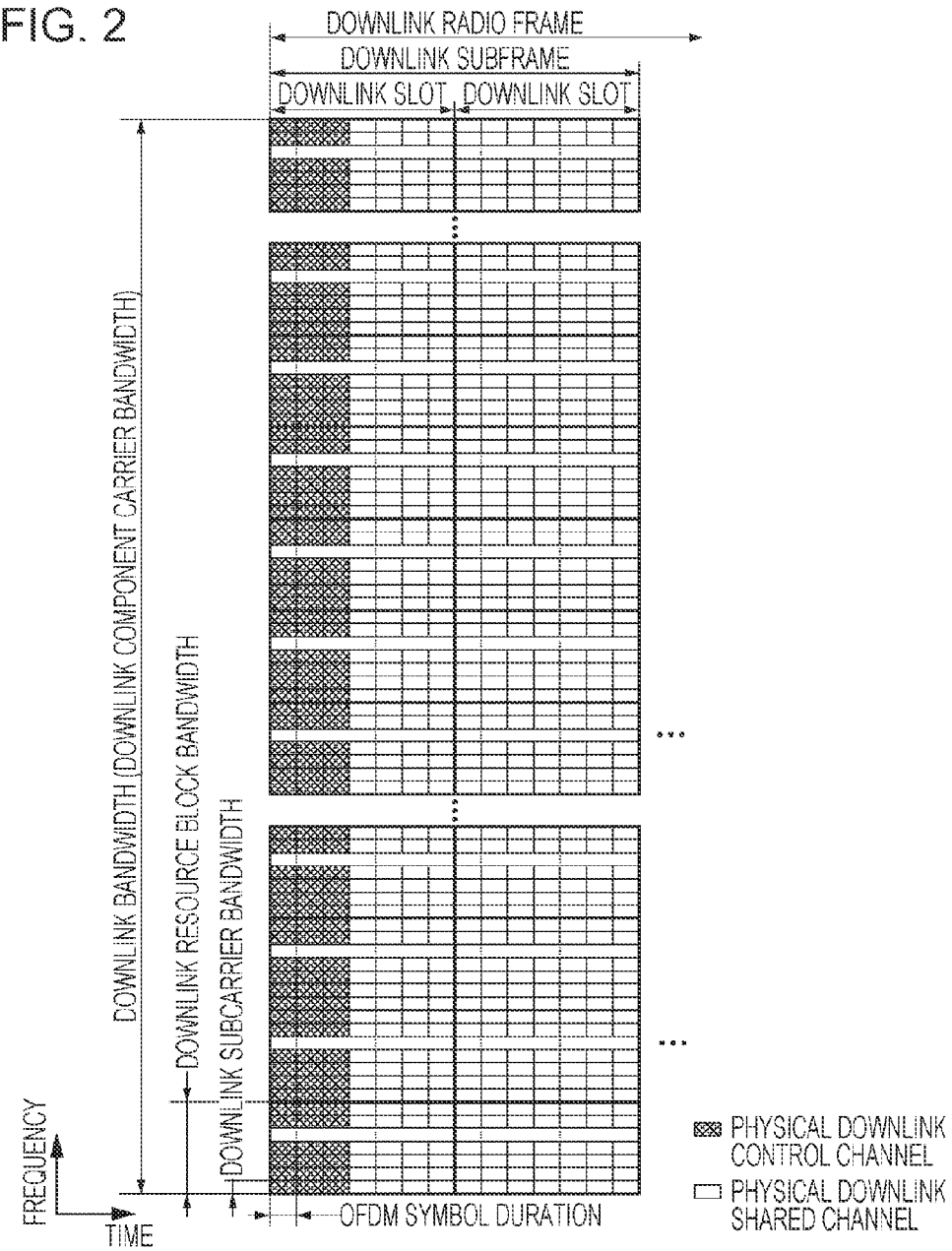
FIG. 2 is a diagram illustrating an example of the structure of a downlink radio frame according to the first embodiment.

FIG. 2 is a diagram illustrating an example of the structure of a downlink radio frame according to the first embodiment. The OFDM access scheme is used in the downlink. In the downlink, the PDCCH, the physical downlink shared channel (PDSCH) and the like are allocated. A downlink radio frame is composed of pairs of downlink resource blocks (RBs). This downlink RB pair is a unit of downlink radio resource allocation, and is composed of a frequency band (RB bandwidth) and time band (two slots=one subframe) of a predetermined width. One downlink RB pair is composed of two consecutive downlink RBs (each composed of an RB bandwidth×a slot) in the time domain. One downlink RB is composed of twelve subcarriers in the frequency domain and seven OFDM symbols in the time domain. A region defined by one subcarrier in the frequency domain and one OFDM symbol in the time domain is referred to as a resource element (RE). The physical downlink control channel is a physical channel on which downlink control information such as the terminal-device identifier, scheduling information of the physical downlink shared channel, scheduling information of the physical uplink shared channel, the modulation scheme, the coding rate, and re-transmission parameters is transmitted. Note that the downlink subframe in one component carrier (CC) is illustrated in here; however, the downlink subframe is defined for each CC, and the downlink subframes are substantially synchronized among the CCs.

Figure 3:
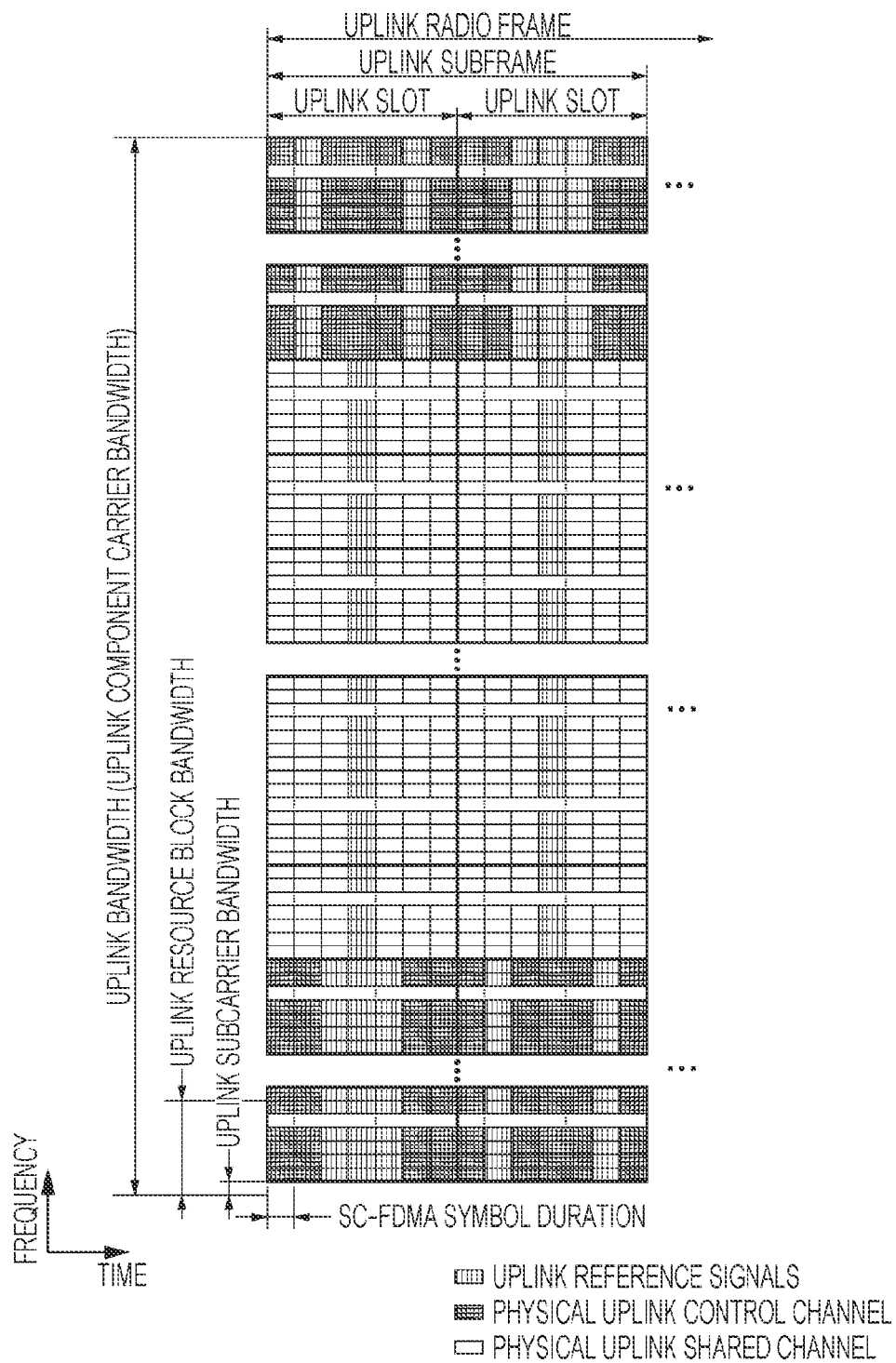
FIG. 3 is a diagram illustrating an example of the structure of an uplink radio frame according to the first embodiment.

FIG. 3 is a diagram illustrating an example of the structure of an uplink radio frame according to the first embodiment. The SC-FDMA scheme is used in the uplink. In the uplink, the physical uplink shared channel (PUSCH), the PUCCH and the like are allocated. Also, uplink reference signals are allocated in part of the PUSCH and PUCCH. An uplink radio frame is composed of uplink RB pairs. This uplink RB pair is a unit of uplink radio resource allocation, and is composed of a frequency band (RB bandwidth) and time band (two slots=one subframe) of a predetermined width. One uplink RB pair is composed of two uplink RBs (each composed of an RB bandwidth×a slot) in the time domain. One uplink RB is composed of twelve subcarriers in the frequency domain and seven SC-FDMA symbols in the time domain. Note that the uplink subframe in one CC is illustrated in here; however, the uplink subframe is defined for each CC.

Figure 4:
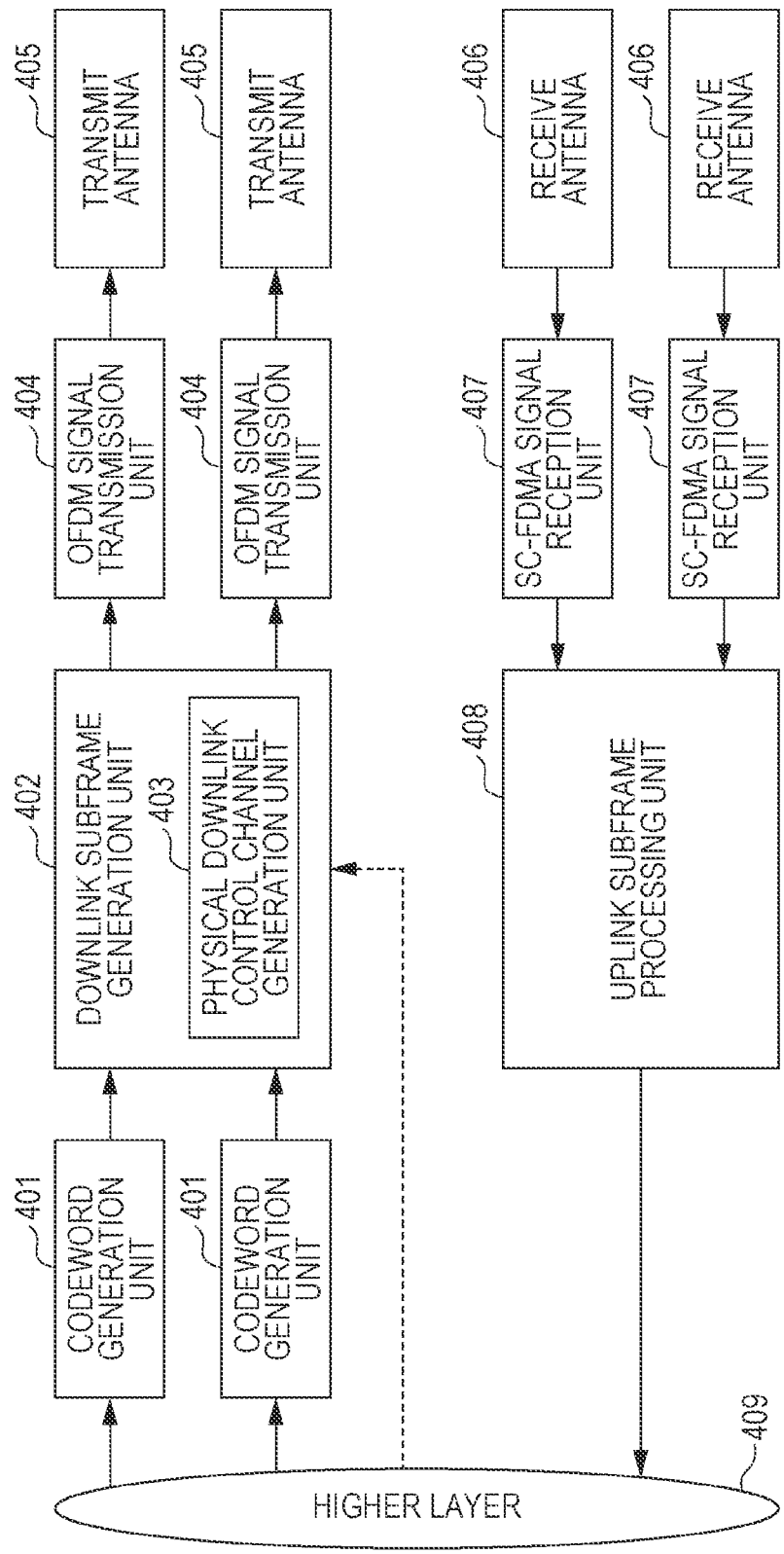
FIG. 4 is a schematic diagram illustrating an example of the configuration of blocks of a base station according to the first embodiment.

FIG. 4 is a schematic diagram illustrating an example of the configuration of blocks of the base station 101 according to the first embodiment. The base station 101 includes codeword generation units 401, a downlink subframe generation unit 402, OFDM signal transmission units (downlink control channel transmission units) 404, transmit antennas (base-station transmit antennas) 405, receive antennas (base-station receive antennas) 406, SC-FDMA signal reception units 407, an uplink subframe processing unit 408, and a higher layer (higher-layer control information notification unit) 409. The downlink subframe generation unit 402 includes a physical downlink control channel generation unit 403.

Figure 5:
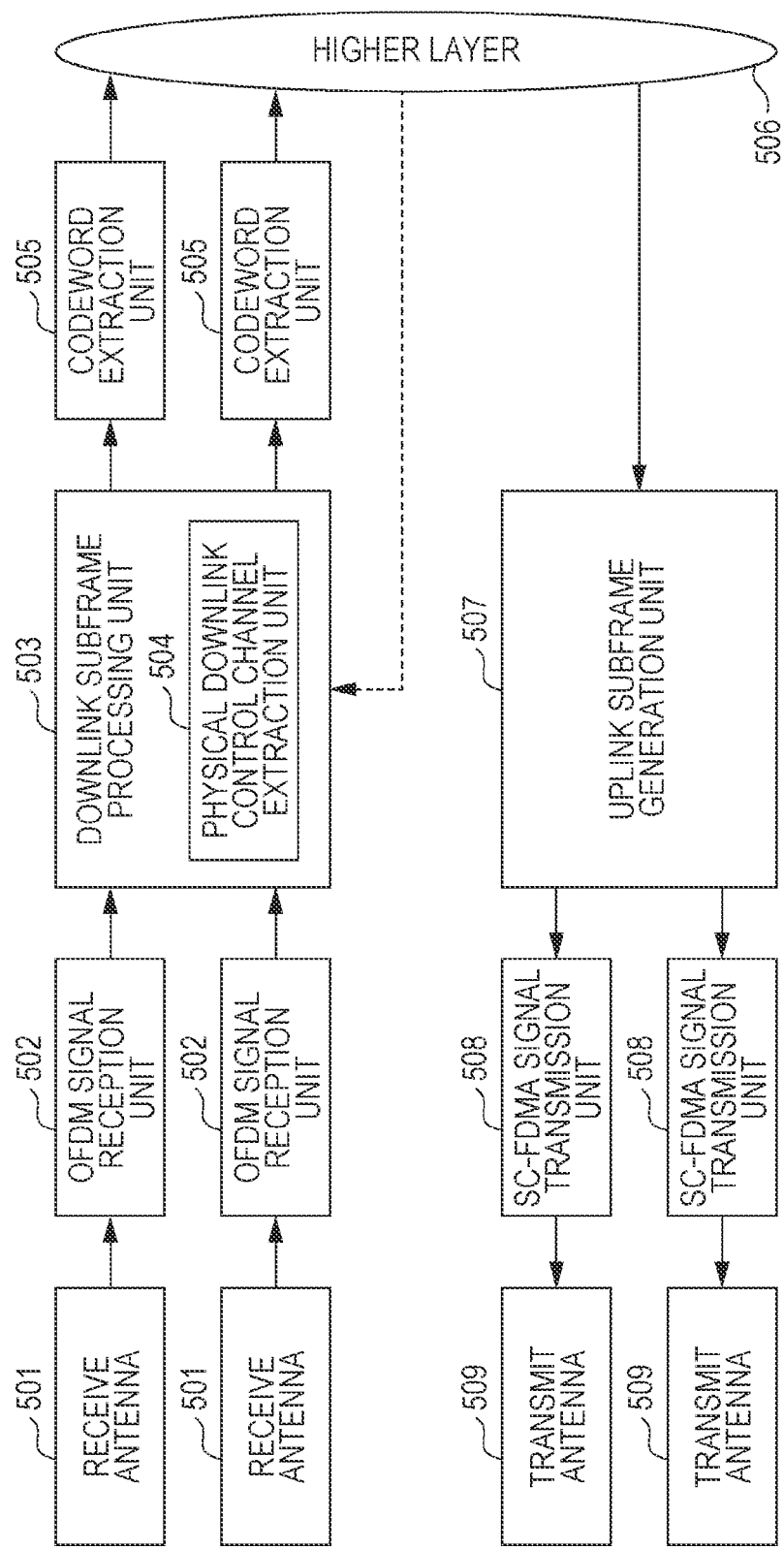
FIG. 5 is a schematic diagram illustrating an example of the configuration of blocks of a terminal according to the first embodiment.

FIG. 5 is a schematic diagram illustrating an example of the configuration of blocks of the terminal 102 according to the first embodiment. The terminal 102 includes receive antennas (terminal receive antennas) 501, OFDM signal reception units (downlink reception units) 502, a downlink subframe processing unit 503, codeword extraction units (data extraction units) 505, a higher layer (higher-layer control information acquisition unit) 506, an uplink subframe generation unit 507, SC-FDMA signal transmission units 508, and transmit antennas (terminal transmit antennas) 509. The downlink subframe processing unit 503 includes a physical downlink control channel extraction unit (downlink control channel detection unit) 504.

First, the flow of how downlink data is transmitted and received will be described using FIG. 4 and FIG. 5. In the base station 101, transmission data (also referred to as a transport block) sent from the higher layer 409 is subjected to processing, such as error correction coding and rate matching processing, by the codeword generation units 401, and consequently codewords are generated. This downlink transmission data may be transmission data intended for the terminal 102 or transmission data common to a plurality of terminals, such as paging or system information. Up to two codewords are transmitted simultaneously within one subframe in one cell. In accordance with an instruction given by the higher layer 409, the downlink subframe generation unit 402 generates downlink subframes. First, codewords generated by the codeword generation units 401 are converted into a modulated symbol sequence through modulation processing, such as PSK (Phase Shift Keying) modulation or QAM (Quadrature Amplitude Modulation) modulation. The modulated symbol sequence is mapped to REs in some of RBs, and downlink subframes for individual antenna ports are generated through precoding processing. Note that REs are defined to correspond to respective subcarriers on OFDM symbols in the downlink. At this time, a transmission data sequence sent from the higher layer 409 contains control information (higher-layer control information) for RRC (Radio Resource Control) signaling. Also, a physical downlink control channel is generated by the physical downlink control channel generation unit 403. Here, control information (downlink control information, downlink grant) contained in the physical downlink control channel contains information, such as MCS (Modulation and Coding Scheme) representing the modulation scheme and the like used in the downlink, downlink resource allocation representing RBs used for data transmission, HARQ control information (redundancy version/HARQ process number/new data indicator) used for control of HARQ, and a PUCCH-TPC (Transmission Power Control) command used for control of power of PUCCH closed-loop transmission. In accordance with an instruction given by the higher layer 410, the downlink subframe generation unit 402 masks the physical downlink control channel with an RNTI corresponding to the type of downlink transmission data, and maps the resulting physical downlink control channel to REs in the downlink subframes. The downlink subframes for each antenna port generated by the downlink subframe generation unit 402 are modulated by the corresponding OFDM signal transmission unit 404 into an OFDM signal, and the OFDM signal is transmitted via the corresponding transmit antenna 405.

In the terminal 102, the OFDM signal is received by each OFDM signal reception unit 502 via the corresponding receive antenna 501, and is subjected to OFDM demodulation processing. The downlink subframe processing unit 503 first detects a PDCCH (first downlink control channel) or an E-PDCCH (second downlink control channel) with the physical downlink control channel extraction unit 504. More specifically, a potential region (first downlink control channel region) to which the PDCCH is mapped or a potential region (second downlink control channel region, potential E-PDCCH) to which the E-PDCCH is mapped is decoded, and verification is performed on pre-attached CRC check bits (blind decoding). That is, the physical downlink control channel extraction unit 504 monitors the PDCCH mapped to the PDCCH region and the E-PDCCH mapped to a PDSCH region which is different from the PDCCH region. If the CRC check bits match the ID (RNIT) assigned in advance by the base station, the downlink subframe processing unit 503 recognizes that the PDCCH or the E-PDCCH has been detected, and extracts the PDSCH by using control information contained in the detected PDCCH or E-PDCCH. More specifically, RE demapping processing and demodulation processing respectively corresponding to RE mapping processing and modulation processing that have been performed by the downlink subframe generation unit 402 are performed. The PDSCH extracted from the received downlink subframes is sent to the codeword extraction unit 505. Each codeword extraction unit 505 performs rate matching processing and error correction decoding respectively corresponding to rate matching processing and error correction coding that have been performed by the codeword generation units 401 so as to extract the transport block, and sends the transport block to the higher layer 506. That is, in the case where the physical downlink control channel extraction unit 504 has detected the PDCCH or the E-PDCCH, the codeword extraction unit 505 extracts transmission data on the PDSCH associated with the detected PDCCH or E-PDCCH, and sends the transmission data to the higher layer 506.

Next, the flow of how uplink transmission data is transmitted and received will be described. In the terminal 102, the uplink subframe generation unit 507 maps uplink transmission data sent from the higher layer 506, to RBs within uplink subframes. Each SC-FDMA signal transmission unit 508 performs SC-FDMA modulation on the uplink subframes so as to generate an SC-FDMA signal, and the SC-FDMA signal is transmitted via the corresponding transmit antenna 509.

In the base station 101, the SC-FDMA signal is received by each SC-FDMA signal reception unit 407 via the corresponding receive antenna 406, and is subjected to SC-FDMA demodulation processing. The uplink subframe processing unit 408 extracts the uplink transmission data from the RBs to which the uplink transmission data is mapped, and the extracted uplink transmission data is sent to the higher layer 409.

Figure 6:
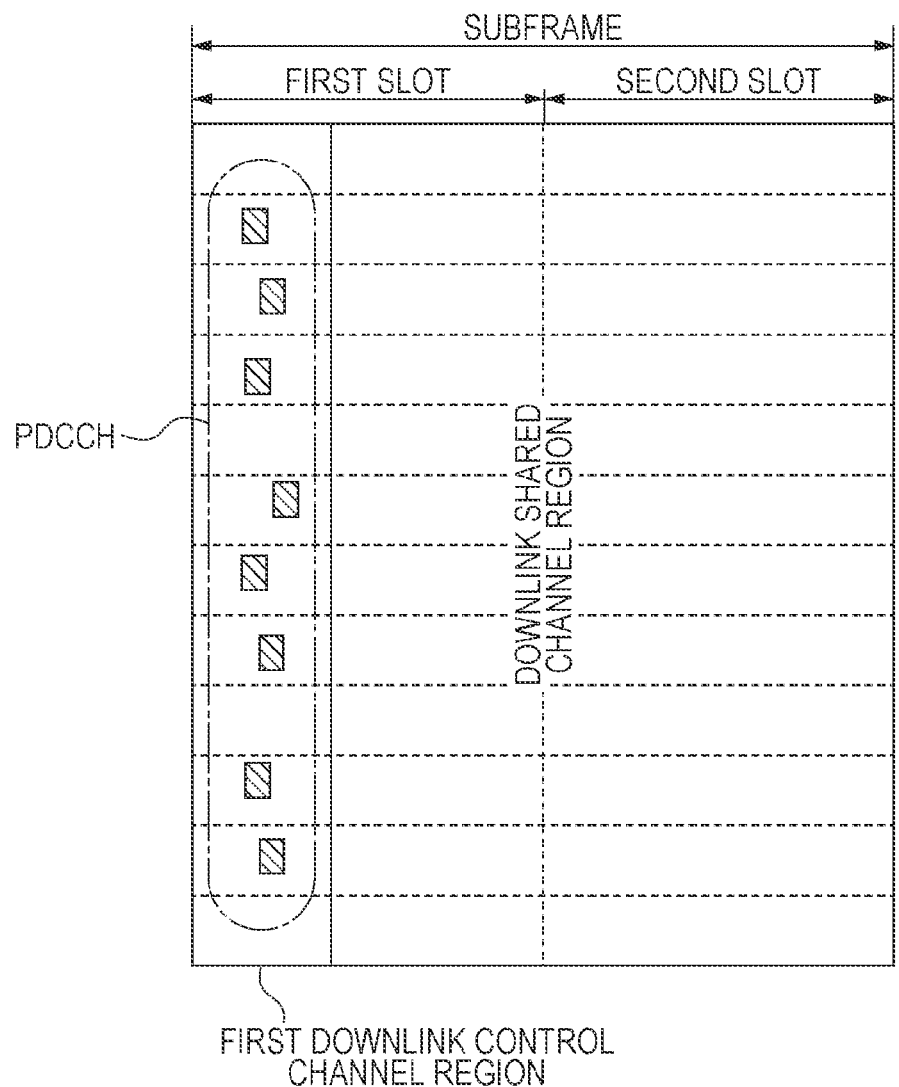
FIG. 6 is a diagram illustrating a PDCCH region and a PDSCH region according to the first embodiment.

Next, the PDCCH will be described. FIG. 6 is a diagram illustrating a PDCCH region and a PDSCH region. The PDCCH which is a first control channel is mapped to the first to third OFDM symbols in the subframe. The first control channel is mapped over the entire system bandwidth in the frequency direction. Also, a shared channel is mapped to OFDM symbols of the subframe other than those of the first control channel. The PDCCH is composed of a plurality of control channel elements (CCEs). The number of CCEs used in each downlink component carrier depends on the downlink component carrier bandwidth, the number of OFDM symbols constituting the PDCCH, and the number of transmit ports associated with downlink reference signals which corresponds to the number of transmit antennas used for communication by the base station. A CCE is composed of a plurality of downlink resource elements (each of which is a resource defined by one OFDM symbol and one subcarrier).

CCEs used between the base station and the terminal are each assigned a number identifying the CCE. Numbering of CCEs is performed in accordance with a predetermined rule. Here, a CCE_t represents a CCE assigned the CCE number t. A PDCCH is composed of an aggregation (CCE aggregation) of a plurality of CCEs. The number of CCEs constituting this aggregation is referred to as a "CCE aggregation level". The CCE aggregation level of a PDCCH is set by the base station in accordance with the coding rate set for the PDCCH and the number of bits of DCI contained in the PDCCH. Note that a combination of CCE aggregation levels that can be used for a terminal is predetermined. Also, an aggregation composed of n CCEs is referred to as "CCE aggregation level n".

One resource element group is composed of four adjacent downlink resource elements in the frequency domain. Further, one CCE is composed of nine different resource element groups distributed in the frequency and time domain. Specifically, all numbered resource element groups are interleaved in units of resource element groups using a block interleaver in the entire downlink component carrier, and one CCE is created using nine interleaved resource element groups assigned consecutive numbers.

Each terminal is configured with a search space (SS), which is a space in which the PDCCH or the E-PDCCH is searched for. An SS is composed of a plurality of CCEs. CCEs are numbered in advance, and an SS is created using a plurality of CCEs with consecutive numbers. The number of CCEs constituting an SS is predetermined. An SS for each CCE aggregation level is composed of an aggregation of a plurality of PDCCH candidates. SSs are classified into a CSS (Cell-specific SS) whose CCE with the smallest number among constituent CCEs is commonly used within a cell, and USS (UE-specific SS) whose CCE with the smallest number among constituent CCEs is specific to a terminal. In a CSS, a PDCCH assigned (containing) control information to be read by a plurality of terminals, such as system information or information regarding paging; or a PDCCH assigned (containing) a downlink/uplink grant which represents fallback to a lower transmission scheme and a random access indication can be mapped.

The base station transmits the PDCCH using one or more CCEs in an SS configured for the terminal. The terminal performs processing for detecting the PDCCH intended therefor by decoding a signal received using one or more CCEs within the SS (referred to as blind decoding). The terminal sets different SSs for different CCE aggregation levels. Thereafter, the terminal performs blind decoding using a predetermined combination of CCEs in different SSs for different CCE aggregation levels. In other words, the terminal performs blind decoding on individual PDCCH candidates in different SSs for different CCE aggregation levels. This processing sequence performed by the terminal is referred to as PDCCH monitoring.

The base station maps, to the CSS, a PDCCH that indicates paging or system information, or a random access response (PDCCH that specifies transmission data common to a plurality of terminals). Also, the terminal performs PDCCH monitoring (blind decoding and verification of the CRC check bits) in the CSS by using the P-RNTI, SI-RNTI, RA-RNTI, or the like.

Figure 7:
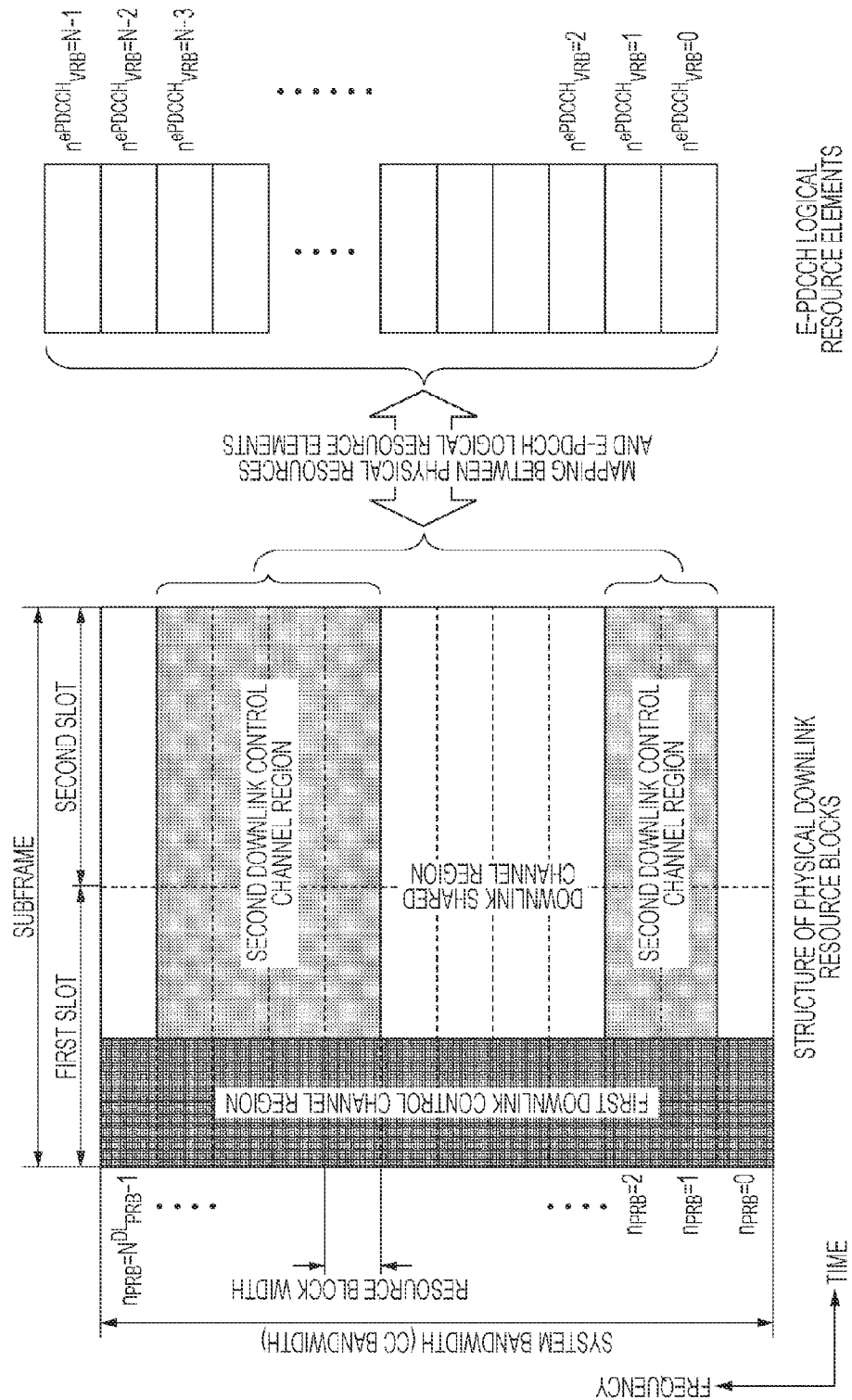
FIG. 7 is a diagram illustrating physical resource blocks PRBs in an E-PDCCH region and a PDSCH region and E-PDCCH logical resource elements according to the first embodiment.

Next, the E-PDCCH will be described. FIG. 7 is a diagram illustrating PRBs (Physical RBs) in an E-PDCCH region and a PDSCH region, and E-PDCCH logical resource elements. RBs in an actual subframe are referred to as PRBs. Also, RBs which are logical resources used in RB allocation are referred to as VRBs (Virtual RBs). Although the case where VRBs serve as E-PDCCH logical resource elements will be described here, the configuration is not limited to this one.

The E-PDCCH is mapped to OFDM symbols other than those for the PDCCH (note that the E-PDCCH may be mapped in a partially overlapping manner). The E-PDCCH is frequency-multiplexed with the PDSCH. Also, each terminal is configured with resource blocks to which the E-PDCCH can be mapped. In addition, as for the start position of OFDM symbols to which the E-PDCCH is mapped, a method that is the same as or different from that used for the shared channel can be used.

$N^{DL}_{PRB}$ represents the number of PRBs arranged within a downlink CC in the frequency direction. PRBs (or PRB pairs) are each assigned a number $n_{PRB}$, and $n_{PRB}$ represents 0, 1, 2, ..., $N^{DL}_{PRB}-1$ in ascending order of frequency. Let N represent the number of VRBs arranged within the downlink CC in the frequency direction. E-PDCCH logical resource elements are each assigned a number $n_{VRB}$, and $n_{VRB}$ represents 0, 1, 2, ..., N-1 in ascending order of frequency. Individual PRBs and individual E-PDCCH logical resource elements are mapped explicitly or implicitly/in an implied manner. Note that the number mentioned here can be expressed as an index.

Figure 8:
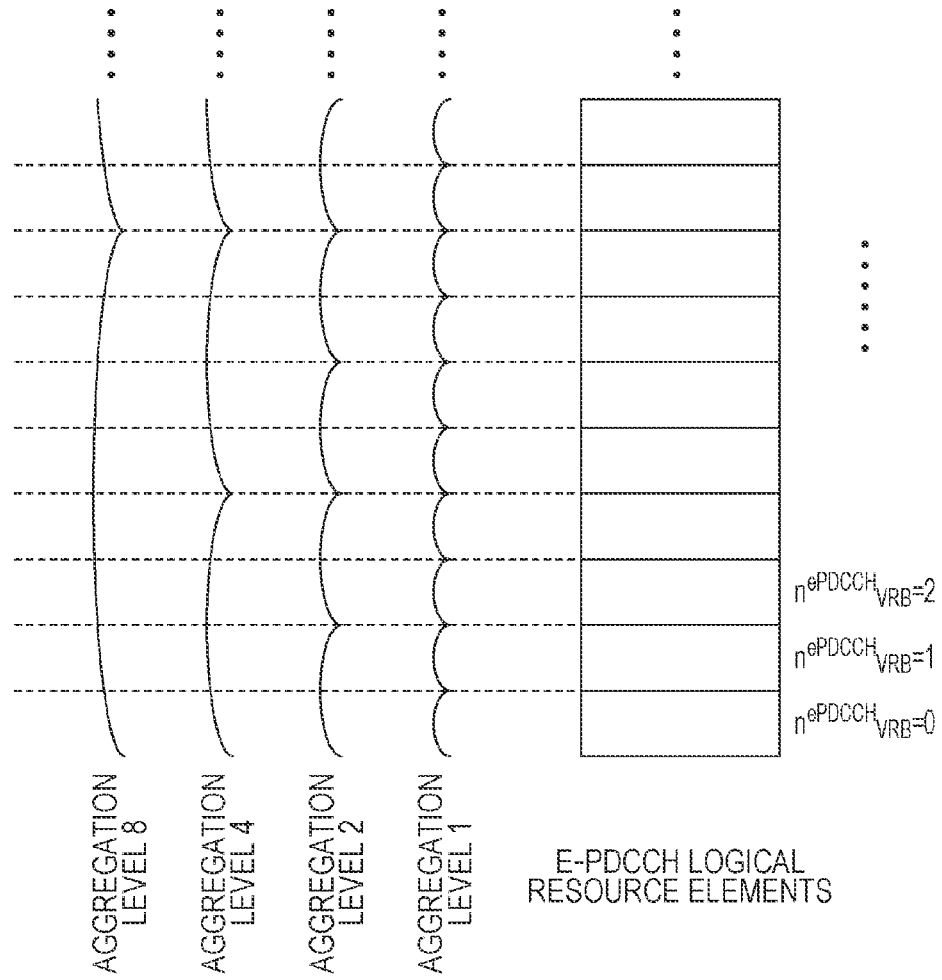
FIG. 8 is a diagram illustrating an example of how E-PDCCH logical resources are aggregated in accordance with the first embodiment.

Like the PDCCH, the E-PDCCH is composed of an aggregation of a predetermined number (aggregation level) of E-PDCCH logical resource elements. FIG. 8 is a diagram illustrating an example of how E-PDCCH logical resources are aggregated. Here, four aggregation levels from aggregation level 1 to aggregation level 8 are illustrated. One E-PDCCH is composed of one to eight E-PDCCH logical resource elements.

Figure 9:
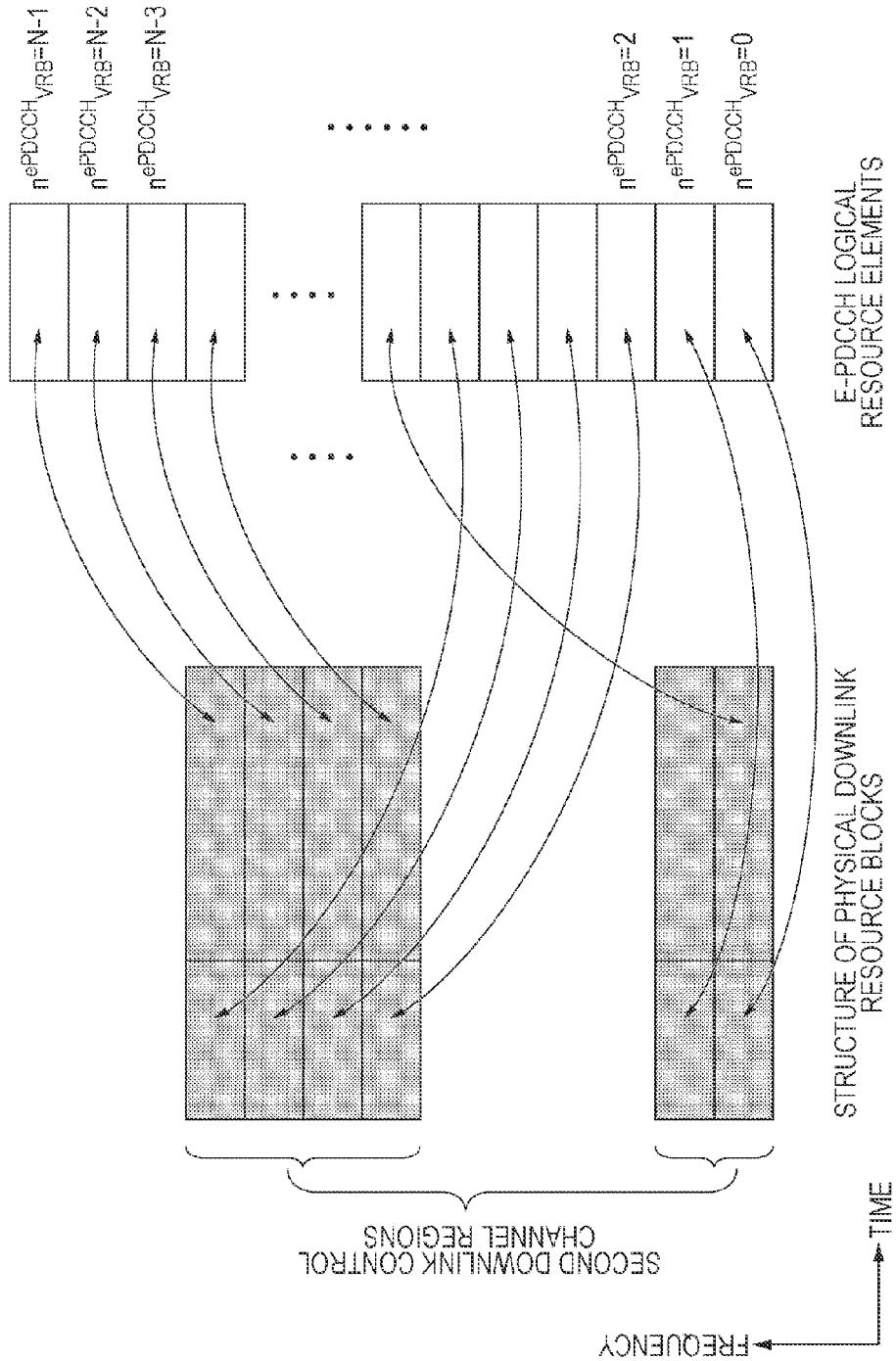
FIG. 9 is a diagram illustrating an example of mapping between E-PDCCH logical resource elements and PRBs in an E-PDCCH region and a PDSCH region in accordance with the first embodiment.

FIG. 9 is a diagram illustrating an example of mapping between E-PDCCH logical resource elements and PRBs in an E-PDCCH region and a PDSCH region. According to this mapping method applied to PRBs and E-PDCCH logical resource elements, one E-PDCCH logical resource element is mapped to one PRB. First, E-PDCCH logical resource elements are mapped to PRBs in the first slot so that $n_{VRB}$ increases as $n_{PRB}$ of the PRBs increases. Then, E-PDCCH logical resource elements are mapped to PRBs in the second slot so that $n_{VRB}$ increases as $n_{PRB}$ of the PRBs increases. That is, loop processing for $n_{PRB}$ of PRBs is performed within a loop of slots. Alternatively, although not illustrated here, E-PDCCH logical resource elements may be mapped to PRBs so that $n_{VRB}$ increases in an order of the first slot and the second slot and then in an order in which $n_{PRB}$ increases in the next first lot. That is, loop processing for slots may be performed within a loop of $n_{PRB}$ of PRBs.

By mapping one E-PDCCH logical resource element to one PRB in this way, an E-PDCCH can be locally mapped on the frequency axis (resource allocation type 1). E-PDCCH transmission using such mapping that enables transmission of a localized E-PDCCH is referred to localized E-PDCCH transmission (first E-PDCCH transmission). Localized E-PDCCH transmission enables transmission of the E-PDCCH using a frequency channel with a good quality in a frequency selective fading environment. Therefore, a large gain can be obtained in the case where frequency selectivity of the channel is grasped.

On the other hand, by mapping one E-PDCCH logical resource element to a plurality of PRBs, an E-PDCCH can be mapped in a distributed manner on the frequency axis (resource allocation type 2). E-PDCCH transmission using such mapping that enables transmission of a distributed E-PDCCH is referred to as distributed E-PDCCH transmission (second E-PDCCH transmission). Mapping between PRBs and E-PDCCH logical resource elements used in distributed E-PDCCH transmission will be described below. With distributed E-PDCCH transmission, large frequency diversity can be obtained in a frequency selective fading environment. Therefore, a gain which is not influenced by frequency selectivity of the channels can be obtained.

Figure 10:
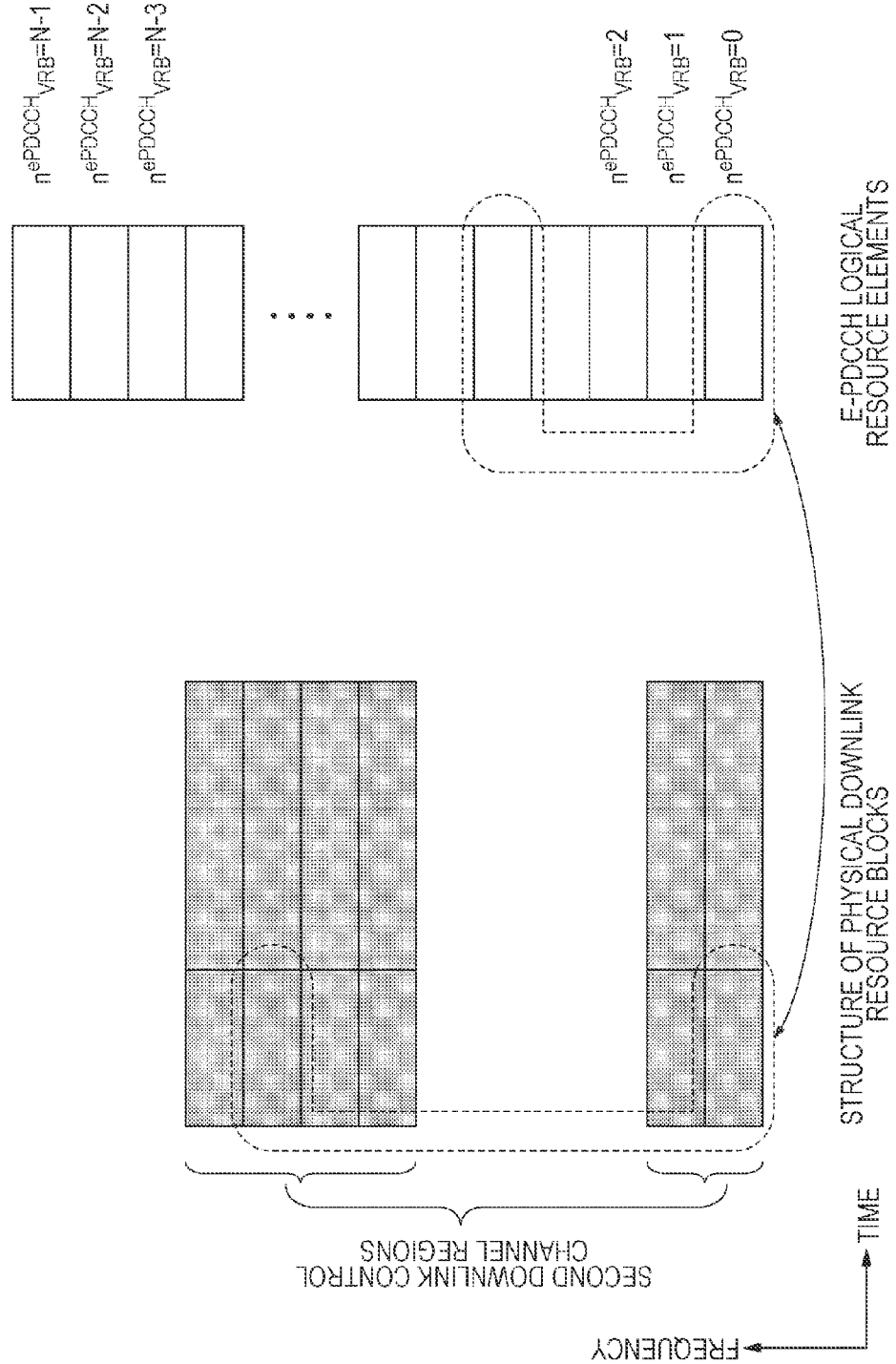
FIG. 10 is a diagram illustrating another example of mapping between E-PDCCH logical resource elements and PRBs in an E-PDCCH region and a PDSCH region in accordance with the first embodiment.

FIG. 10 is a diagram illustrating another example of mapping between E-PDCCH logical resource elements and PRBs in an E-PDCCH region and a PDSCH region. According to this mapping method applied to PRBs and E-PDCCH logical resource elements, a set of a plurality of E-PDCCH logical resource elements is mapped to a set of a plurality of PRBs. Mapping of one set to one set is illustrated here; however, the illustrated set is one mapped set among a plurality of sets mapped to a plurality of sets, and there are other sets of E-PDCCH logical resource elements and sets of PRBs. Also, a set of a plurality of PRBs within the first slot is illustrated as the set of PRBs here: however, the set of PRBs is not limited to this one. The set of PRBs may be a set of a plurality of PRBs within the second slot. Alternatively, one set may be created using PRB(s) within the first slot and PRB(s) within the second slot. In addition, the case where the number of elements constituting the set is two is illustrated here; however, the number of elements is not limited to this one. For example, the number of E-PDCCH logical resource elements may be increased so that a set of four E-PDCCH logical resource elements is mapped to a set of two PRBs; or the number of PRBs may be increased so that a set of two E-PDCCH logical resource elements is mapped to a set of four PRBs. Alternatively, three or more elements, instead of two, may be used to create each set.

Figure 11:
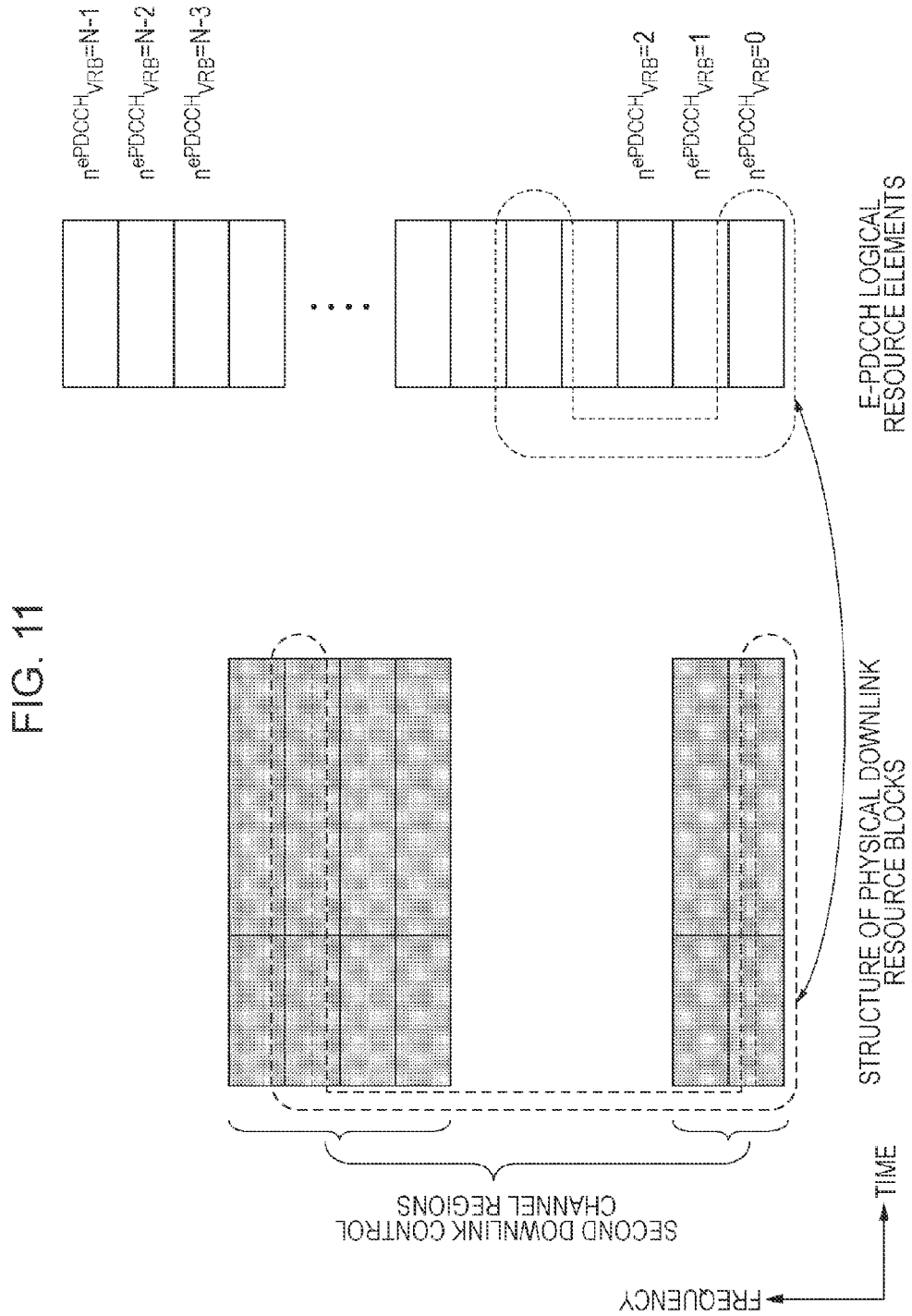
FIG. 11 is a diagram illustrating another example of mapping between E-PDCCH logical resource elements and PRBs in an E-PDCCH region and a PDSCH region in accordance with the first embodiment.

FIG. 11 is a diagram illustrating another example of mapping between E-PDCCH logical resource elements and PRBs in an E-PDCCH region and a PDSCH region. According to this mapping method applied to PRBs and E-PDCCH logical resource elements, a set of a plurality of E-PDCCH logical resource elements is mapped to a set of a plurality of partial PRB pairs. A difference between FIG. 11 and FIG. 10 is that PRBs are replaced with partial PRB pairs. Here, a partial PRB pair refers to a region obtained by dividing one PRB pair in the frequency direction and/or the time direction. FIG. 11 illustrates an example in which a PRB pair is divided into two portions in the frequency direction; however, a partial PRB pair is not limited to this one. A partial PRB pair may be any region that is obtained by dividing one PRB pair in the frequency direction and/or the time direction. From this point of view, a PRB can be considered as a partial PRB pair obtained by dividing a PRB pair in the time direction.

Figure 12:
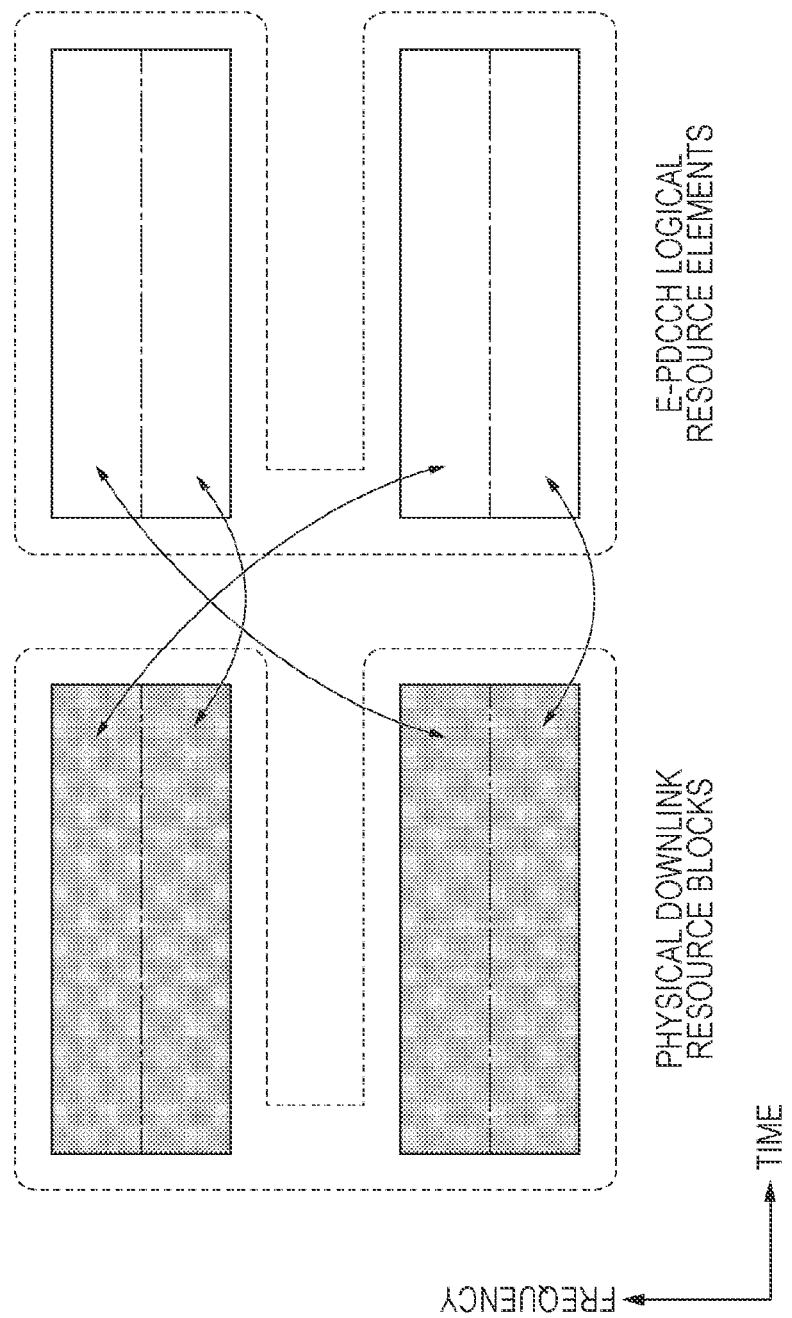
FIG. 12 is a diagram illustrating an example of mapping between E-PDCCH logical resource elements and REs in accordance with the first embodiment.

Next, a description will be given of mapping between E-PDCCH logical resource elements and REs employed in the case where a set of a plurality of E-PDCCH logical resource elements is mapped to a set of a plurality of partial PRB pairs (including PRBs). FIG. 12 is a diagram illustrating an example of mapping between E-PDCCH logical resource elements and REs. Each E-PDCCH logical resource element and each partial PRB pair are respectively divided into a plurality of sub-elements and a plurality of sub-portions. In particular, each partial PRB pair is divided in the frequency direction. A plurality of sub-elements obtained by dividing one E-PDCCH logical resource element are mapped to respective sub-portions of at least two different partial PRB pairs.

Figure 13:
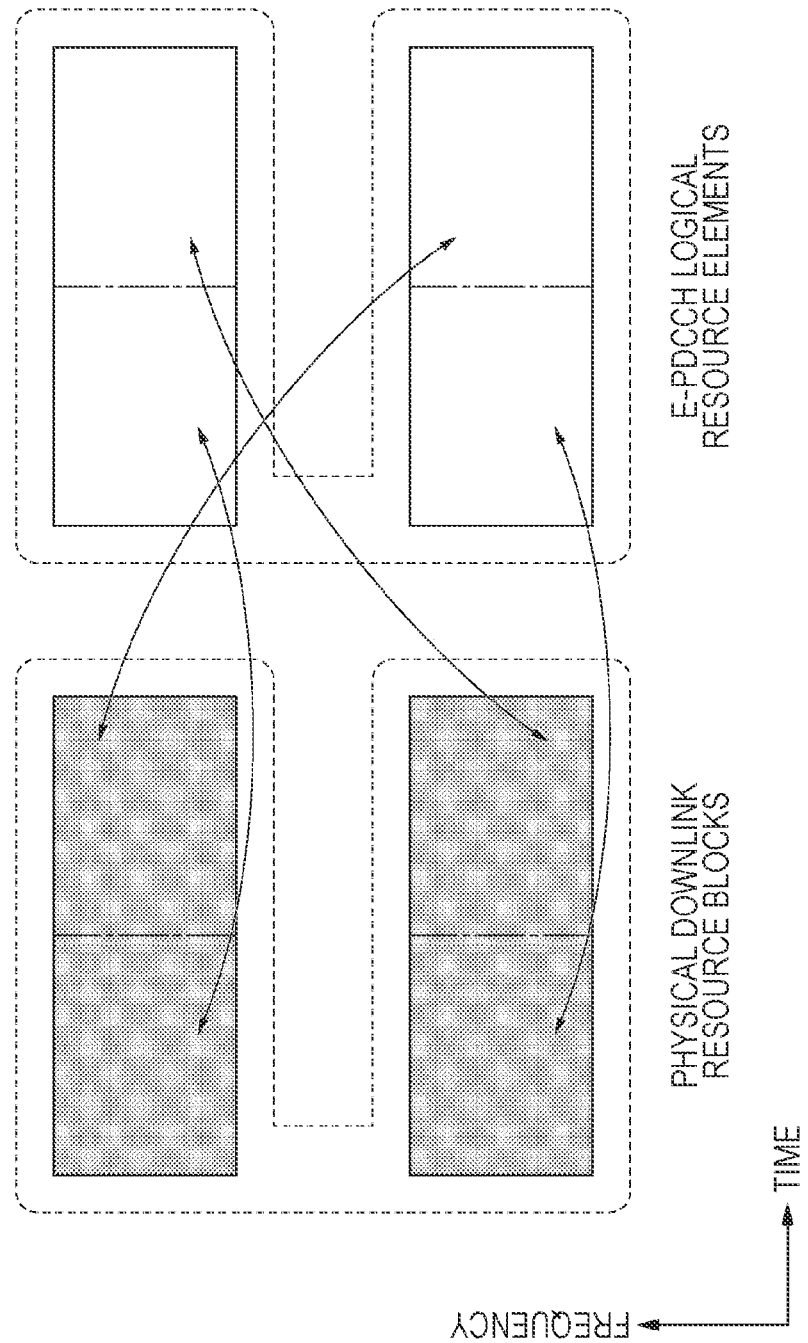
FIG. 13 is a diagram illustrating another example of mapping between E-PDCCH logical resource elements and REs in accordance with the first embodiment.

FIG. 13 is a diagram illustrating another example of mapping between E-PDCCH logical resource elements and REs. Each E-PDCCH logical resource element and each partial PRB pair are respectively divided into a plurality of sub-elements and a plurality of sub-portions. In particular, each partial PRB pair is divided in the time direction. As in FIG. 12, a plurality of sub-elements obtained by dividing one E-PDCCH logical resource element are mapped to respective sub-portions of at least two different partial PRB pairs.

Figure 14:
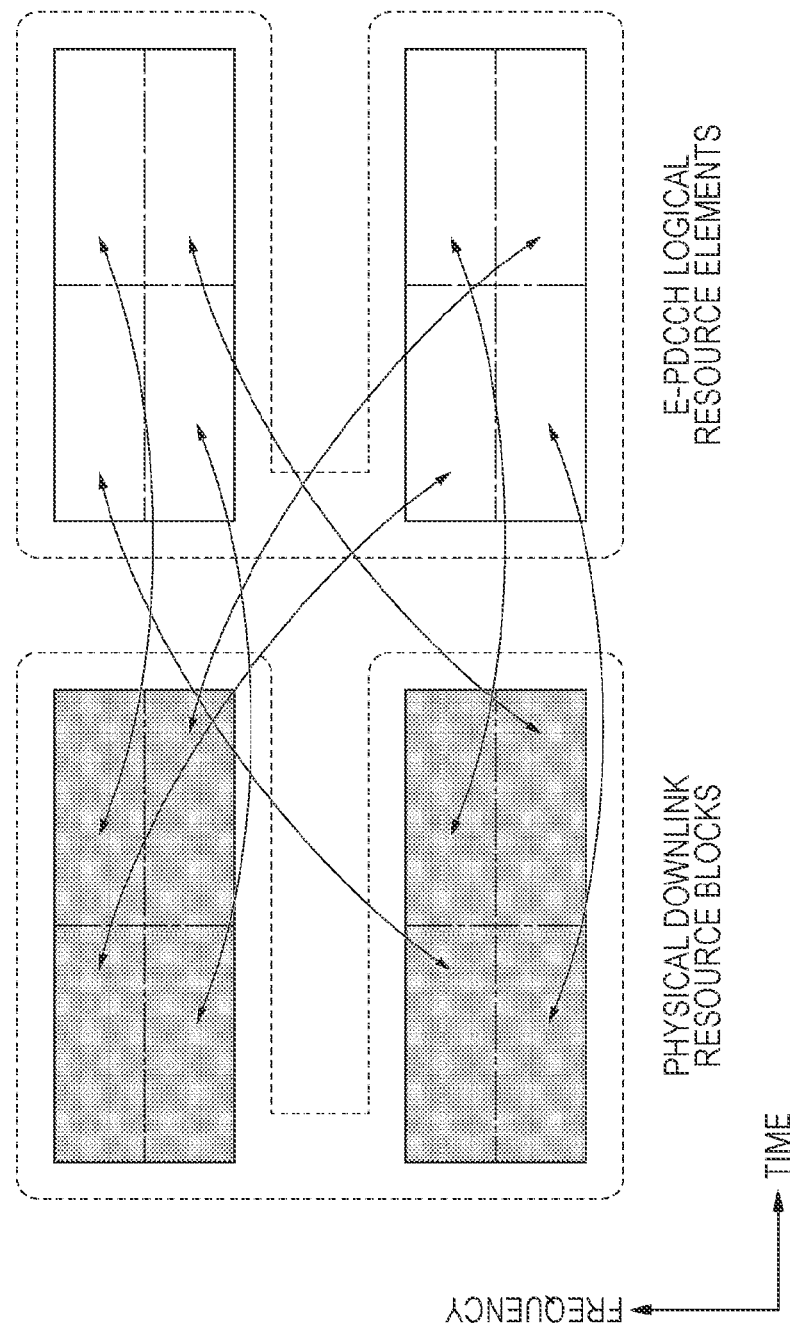
FIG. 14 is a diagram illustrating another example of mapping between E-PDCCH logical resource elements and REs in accordance with the first embodiment.

FIG. 14 is a diagram illustrating another example of mapping between E-PDCCH logical resource elements and REs. Each E-PDCCH logical resource element and each partial PRB pair are respectively divided into a plurality of sub-elements and a plurality of sub-portions. In particular, each partial PRB pair is divided in the time and frequency directions. As in FIG. 12 and FIG. 13, a plurality of sub-elements obtained by dividing one E-PDCCH logical resource element are mapped to respective sub-portions of at least two different partial PRB pairs.

In the mapping applied to E-PDCCH logical resource elements and REs illustrated in FIG. 12 to FIG. 14, preferably, each E-PDCCH logical resource element and each partial PRB pair are divided into the same number of parts, which is represented by K, and the k-th (k is any value of 1, 2, ..., K) sub-element among the K sub-elements obtained by dividing a given E-PDCCH logical resource element is mapped to the k-th sub-portion among the K sub-portions obtained by dividing a partial PRB pair.

More preferably, the numbers of parts obtained by dividing each E-PDCCH logical resource element and each partial PRB pair are set to be equal to K, which is the same as the number of E-PDCCH logical resource elements of one set and the number of partial PRB pairs of one set; and the $k_2$-th ($k_2$ is any value of 1, 2, ..., K) sub-element among the K sub-elements obtained by dividing the $k_1$-th ($k_1$ is any value of 1, 2, ..., K) E-PDCCH logical resource element of one set is mapped to the $k_2$-th sub-portion among the K sub-portions obtained by dividing the "mod($k_1+K_2-2$, K)+1"-th partial PRB pair of one set. Here, mod represents a modulo function.

Localized E-PDCCH transmission and distributed E-PDCCH transmission have been described above. Next, the flow of how transmission data is transmitted from the base station to the terminal will be described by focusing on the case where transmission data common to a plurality of terminals (broadcast transmission data) is transmitted.

Figure 15:
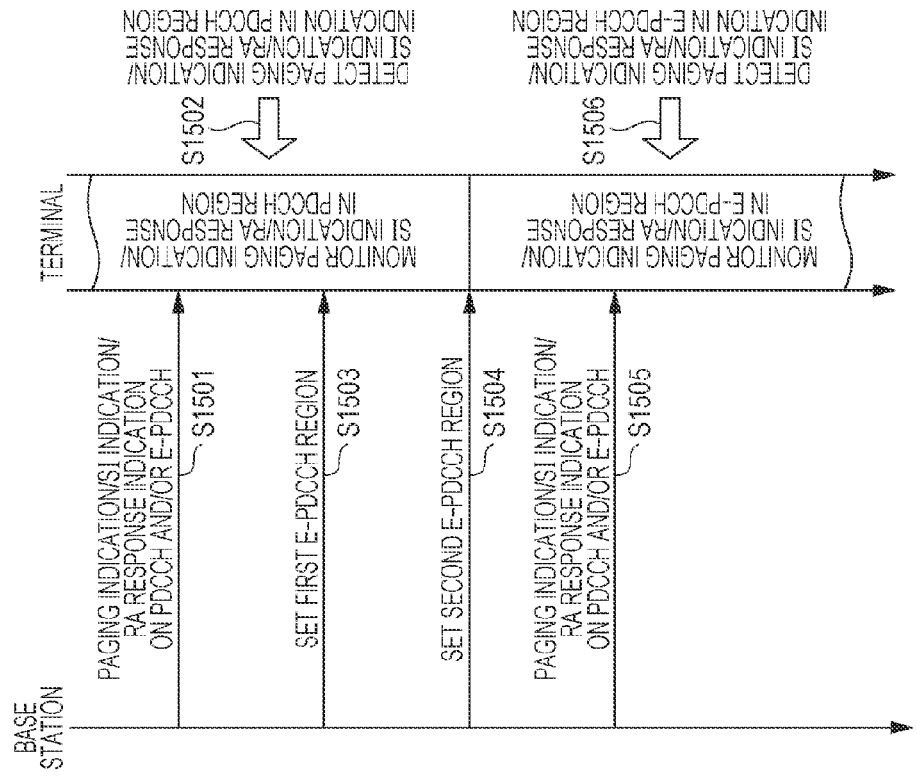
FIG. 15 is a diagram illustrating the flow of downlink data transmission performed between the base station and the terminal according to the first embodiment.

FIG. 15 is a diagram illustrating the flow of downlink data transmission performed between the base station 101 and the terminal 102. After the initial access, the terminal 102 is monitoring a PDCCH (such as a paging indication, an SI indication, or an RA response indication) that specifies broadcast transmission data (such as paging, system information, or random access response) in the PDCCH region. In the case where a need to transmit broadcast transmission data (such as paging, system information, or random access response) arises, the base station 101 transmits a PDCCH that specifies (indicates) the broadcast transmission data at least in the PDCCH region (S1501). Also, the base station 101 may transmit an E-PDCCH that specifies (indicates) the broadcast transmission data in the E-PDCCH region (S1501). Note that although the indication using the PDCCH and the indication using the E-PDCCH are made at the same timing in the figure, the timing is not limited to this one.

The terminal 102 is monitoring the PDCCH that specifies the broadcast transmission data in the PDCCH region, and thus detects this PDCCH transmitted from the base station 101 (S1502).

The base station 101 notifies, using signaling (RRC signaling) separately intended for each terminal 102, the terminal 102 of control information that specifies (sets, informs) the first E-PDCCH region. Based on the control information, the terminal 102 sets the first E-PDCCH region (potential E-PDCCH) (step S1503). Here, as a method for specifying the E-PDCCH region, a method for specifying some or all of RBs within the frequency band can be used. For example, whether or not the E-PDCCH can be mapped can be represented for individual PRBs in a bitmap format. Alternatively, in addition to this method, some subframes in the time domain can be specified as subframes to which the E-PDCCH can be mapped. For example, a method for specifying the period of the subframe and the offset value from the reference subframe can be used. Alternatively, whether or not the E-PDCCH can be mapped can be represented for a radio frame (ten subframes) or each subframe of a plurality of radio frames in a bitmap format.

Here, a setting is made to indicate whether E-PDCCH transmission in the first E-PDCCH region is localized E-PDCCH transmission, distributed E-PDCCH transmission, or both of them. For example, the base station 101 notifies the terminal 102 of whether E-PDCCH transmission in the first E-PDCCH region is localized E-PDCCH transmission, distributed E-PDCCH transmission, or both of them, along with specification (setting, informing) of the first E-PDCCH region. Alternatively, the first E-PDCCH region is predetermined to be used for localized E-PDCCH transmission, distributed E-PDCCH transmission, or both of them. Here, the description will be continued on the assumption that distributed E-PDCCH transmission is not used as E-PDCCH transmission in the first E-PDCCH region.

The terminal 102 configured with the first E-PDCCH region monitors the E-PDCCH that specifies transmission data intended for the terminal 102. On the other hand, the terminal 102 is monitoring the PDCCH that specifies the broadcast transmission data in the PDCCH region. That is, at this point, the terminal 102 is monitoring the PDCCH that specifies the broadcast transmission data in the PDCCH region, and also is monitoring the E-PDCCH that specifies the transmission data intended for the terminal 102 in the first E-PDCCH region.

In the case where the base station 101 desires monitoring of the E-PDCCH that specifies broadcast transmission data in the E-PDCCH region, the base station 101 notifies, using signaling (RRC signaling) separately intended for each terminal 102, the terminal 102 of control information that specifies (sets, informs) a second E-PDCCH region. Based on the control information, the terminal 102 sets the first E-PDCCH region (potential E-PDCCH) (step S1504). Like the setting of the first E-PDCCH region, a setting is made to indicate whether E-PDCCH transmission in the second E-PDCCH region is localized E-PDCCH transmission, distributed E-PDCCH transmission, or both of them. Here, the description will be continued on the assumption that at least distributed E-PDCCH transmission is used as E-PDCCH transmission in the second E-PDCCH region.

Note that one SS may be set in one E-PDCCH region, or a plurality of SSs may be set in one E-PDCCH region. In this case, setting of an E-PDCCH region may further include setting of the SS(s). Also, a setting may be made to indicate whether transmission of interest is localized E-PDCCH transmission, distributed E-PDCCH transmission, or both of them, for each SS within the E-PDCCH region.

Once the second E-PDCCH region used at least for distributed E-PDCCH transmission is set, the terminal 102 monitors the E-PDCCH that specifies the broadcast transmission data in the E-PDCCH region. Therefore, after step S1504, the terminal 102 monitors the E-PDCCH (such as a paging indication, an SI indication, or an RA response indication) that specifies the broadcast transmission data (such as paging, system information, or random access response) in the E-PDCCH region. That is, the region in which the control channel that specifies the transmission data is monitored is switched between the PDCCH region and the E-PDCCH region.

In the case where a need to transmit broadcast transmission data (such as paging, system information, or random access response) arises, the base station 101 transmits an E-PDCCH that specifies (indicates) the broadcast transmission data at least in the E-PDCCH region (S1505). Also, the base station 101 may transmit a PDCCH that specifies (indicates) the broadcast transmission data in the PDCCH region (S1505).

The terminal 102 is monitoring the E-PDCCH that specifies the broadcast transmission data in the E-PDCCH region, and thus detects this E-PDCCH transmitted from the base station 101 (S1506).

Figure 16:
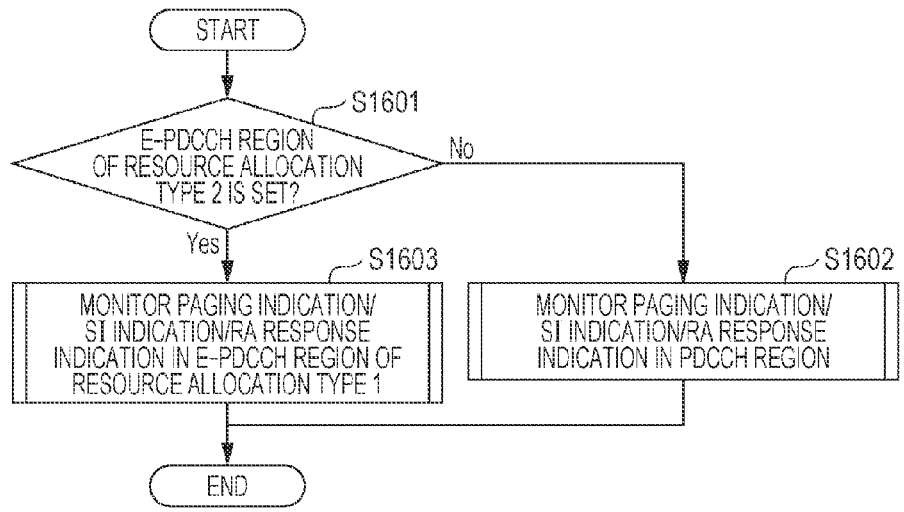
FIG. 16 is a flowchart illustrating an operation performed by the terminal according to the first embodiment.

FIG. 16 is a flowchart illustrating an operation performed by the terminal 102. The terminal 102 determines whether or not an E-PDCCH region used for at least distributed E-PDCCH transmission (E-PDCCH region of resource allocation type 2) is set (step S1601). In the case where only an E-PDCCH region used for localized E-PDCCH transmission (E-PDCCH region of resource allocation type 1) is set, that is, in the case where an E-PDCCH region of resource allocation type 2 is not set (NO in step S1601), the terminal 102 monitors a PDCCH that specifies broadcast transmission data in the PDCCH region (step S1602). On the other hand, in the case where an E-PDCCH region other than the E-PDCCH region of resource allocation type 1 is set, that is, in the case where an E-PDCCH region of resource allocation type 2 is set (YES in step S1601), the terminal 102 monitors an E-PDCCH that specifies broadcast transmission data in the set E-PDCCH region (step S1603).

As described above, in the communications system according to the first embodiment, the base station implicitly or in an implied manner specifies (sets, informs) the terminal to monitor the E-PDCCH that specifies broadcast transmission data in the E-PDCCH region. In the case where the terminal is not configured to monitor the E-PDCCH that specifies broadcast transmission data (to decode the E-PDCCH attached with CRC check bits that have been scrambled with an RNTI corresponding to the broadcast transmission data), the terminal monitors the PDCCH that specifies the broadcast transmission data (decodes the PDCCH attached with CRC check bits that have been scrambled with an RNTI corresponding to the broadcast transmission data) in the PDCCH region instead of the E-PDCCH region. On the other hand, in the case where the terminal is configured to monitor the E-PDCCH that specifies broadcast transmission data, the terminal monitors the E-PDCCH that specifies the broadcast transmission data in the E-PDCCH region instead of the PDCCH region.

In this way, regions in which a control channel that specifies transmission data is to be monitored can be adaptively switched between. Accordingly, even in the case where the base station notifies the terminal of control information not only via a physical downlink control channel but also via an enhanced physical downlink control channel, transmission data intended for each terminal or transmission data common to a plurality of terminals can be specified efficiently.

Second Embodiment

In the first embodiment above, the communications system for explicitly specifying (setting, informing) a plurality of E-PDCCH regions has been described by focusing on the case of transmitting transmission data (broadcast transmission data) common to a plurality of terminals. In a second embodiment of the present invention, a communications system for explicitly specifying (setting, informing) a plurality of E-PDCCH regions will be described by focusing on the case of transmitting transmission data intended for each terminal (transmission data separately for each terminal).

Note that the communications system according to the second embodiment can use the configuration similar to that of the communications system illustrated in FIG. 1. Also, as the configurations of blocks of the base station 101 and the terminal 102 according to the second embodiment, the configurations similar to the configurations of blocks illustrated in FIG. 4 and FIG. 5 can be used. However, the flow of how transmission data is transmitted from the base station to the terminal is slightly different from that of the first embodiment.

Figure 17:
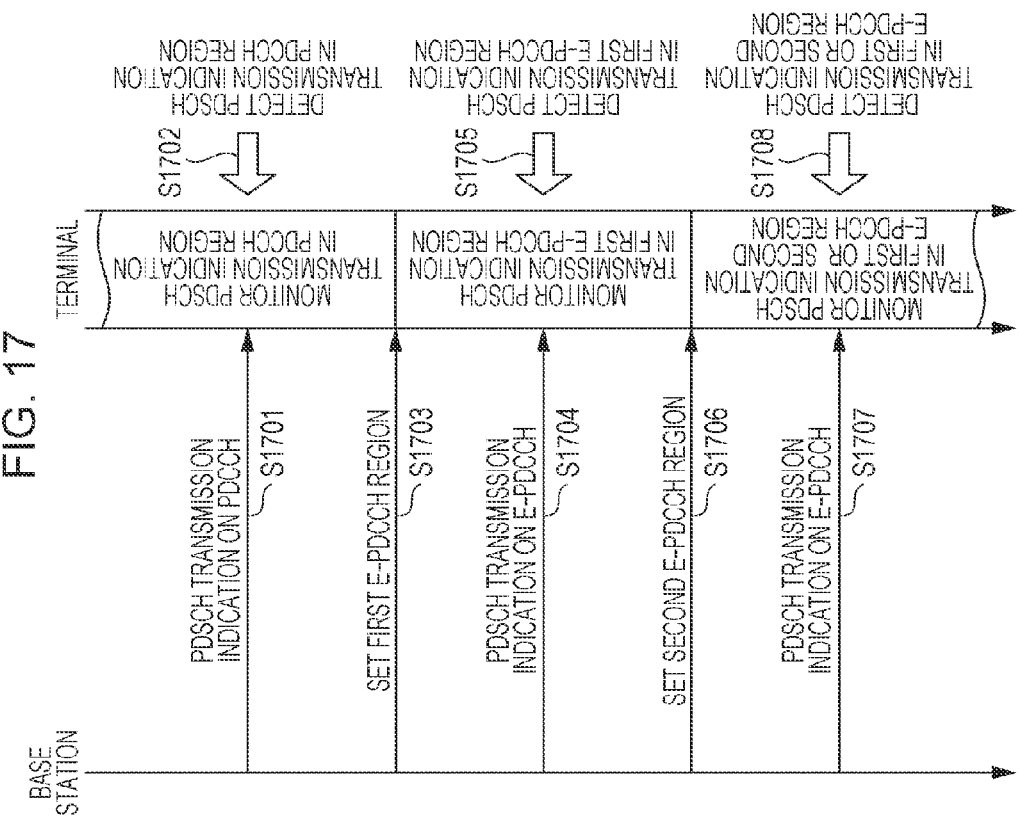
FIG. 17 is a diagram illustrating the flow of downlink data transmission performed between the base station and the terminal according to a second embodiment of the present invention.
Figure 18:
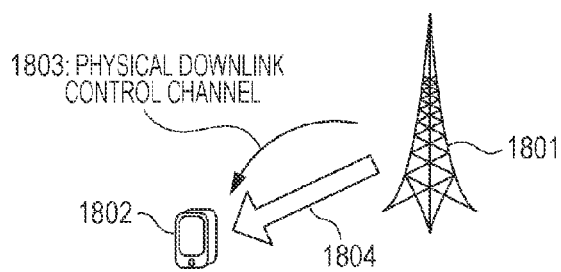
FIG. 18 is a diagram illustrating an example of the configuration of a communications system.

FIG. 17 is a diagram illustrating the flow of downlink data transmission performed between the base station 101 and the terminal 102. After the initial access, the terminal 102 is monitoring a PDCCH (PDCCH attached with CRC check bits that have been scrambled with a C-RNTI) that specifies transmission data (PDSCH transmission) in a PDCCH region. In the case where a need for PDSCH transmission arises, the base station 101 transmits a PDCCH that specifies (indicates) the PDSCH transmission intended for the terminal 102 in the PDCCH region (S1701).

The terminal 102 is monitoring the PDCCH that specifies the PDSCH transmission in the PDCCH region, and thus detects this PDCCH transmitted from the base station 101 (S1702).

The base station 101 notifies, using signaling (RRC signaling) separately intended for each terminal 102, the terminal 102 of control information that specifies (sets, informs) the first E-PDCCH region. Based on the control information, the terminal 102 sets the first E-PDCCH region (potential E-PDCCH) (step S1703). Here, as a method for specifying the E-PDCCH region, a method similar to that used in the first embodiment can be used. Upon being notified of the control information that specifies (sets, informs) the first E-PDCCH region, the terminal 102 switches to monitor, instead of the PDCCH, an E-PDCCH that specifies PDSCH transmission in the first E-PDCCH region (changes the region for monitoring).

Here, it is preferable that a setting be made to indicate whether E-PDCCH transmission in the first E-PDCCH region is localized E-PDCCH transmission, distributed E-PDCCH transmission, or both of them. For example, the base station 101 notifies the terminal 102 of whether E-PDCCH transmission in the first E-PDCCH region is localized E-PDCCH transmission, distributed E-PDCCH transmission, or both of them, along with specification (setting, informing) of the first E-PDCCH region. Alternatively, the first E-PDCCH region is predetermined to be used for localized E-PDCCH transmission, distributed E-PDCCH transmission, or both of them.

In the case where a need for PDSCH transmission arises, the base station 101 transmits an E-PDCCH that specifies (indicates) PDSCH transmission intended for the terminal 102 in the notified first E-PDCCH region (S1704).

The terminal 102 is monitoring the E-PDCCH that specifies the PDSCH transmission intended for the terminal 102 in the E-PDCCH region, and thus detects this E-PDCCH transmitted from the base station 101 (S1705).

Subsequently, the base station 101 additionally notifies, using signaling (RRC signaling) separately intended for each terminal 102, the terminal 102 of control information that specifies (sets, informs) a second E-PDCCH region. Based on the control information, the terminal 102 sets the second E-PDCCH region (potential E-PDCCH) (step 71806). Upon being additionally notified of the control information that specifies (sets, informs) the second E-PDCCH region, the terminal 102 switches to monitor the E-PDCCH that specifies the PDSCH transmission in the second E-PDCCH region in addition to the first E-PDCCH region (changes the region for monitoring).

Here, it is preferable that a setting be made to indicate whether E-PDCCH transmission in the second E-PDCCH region is localized E-PDCCH transmission, distributed E-PDCCH transmission, or both of them as in the first E-PDCCH region.

Note that although FIG. 17 illustrates the case where processing of step S1706 is performed after step S1703, step S1703 and step S1706 may be processed simultaneously.

In the case where a need for PDSCH transmission arises, the base station 101 transmits an E-PDCCH that specifies (indicates) PDSCH transmission intended for the terminal 102 in the first E-PDCCH region or additionally notified second E-PDCCH region (S1707).

The terminal 102 is monitoring the E-PDCCH that specifies the PDSCH transmission intended for the terminal 102 in the first E-PDCCH region or the second E-PDCCH region, and thus detects this E-PDCCH transmitted from the base station 101 (S1708).

As described above, in the communications system according to the second embodiment, the base station specifies (sets, informs) a plurality of E-PDCCH regions for the terminal. Preferably, the resource allocation type is set for each of the plurality of E-PDCCH regions individually (independently of one another). More preferably, the terminal is configured with localized E-PDCCH transmission (resource allocation type 1) in one E-PDCCH region and distributed E-PDCCH transmission (resource allocation type 2) in another E-PDCCH region among the plurality of E-PDCCH regions. The terminal switches between the regions for monitoring in accordance with the settings of the plurality of E-PDCCH regions.

With this configuration, regions in which a control channel that specifies transmission data is to be monitored can be adaptively switched between. Therefore, even in the case where the base station notifies the terminal of control information not only via a physical downlink control channel but also via an enhanced physical downlink control channel, transmission data intended for each terminal or transmission data common to a plurality of terminals can be efficiently specified. Also, gain through distributed E-PDCCH transmission and gain through localized E-PDCCH transmission can be selectively obtained.

The description has been given using resource elements or resource blocks as units in which data channels, control channels, PDSCHs, PDCCHs, and reference signals are mapped, and using subframes or radio frames as units of transmission in the time direction in each of the above-described embodiments; however, the units are not limited to these ones. Similar benefits can be obtained when a region composed of a given frequency and time and a time unit are used instead of these units.

In addition, the description has been given by referring to the enhanced physical downlink control channel 103 mapped to a PDSCH region as an E-PDCCH so as to clarify distinction between the E-PDCCH and the conventional physical downlink control channel (PDCCH) in each of the above-described embodiments; however, the term is not limited to this one. Even in the case where both are referred to as PDCCHs, if different operations are performed for the enhanced physical downlink control channel mapped to the PDSCH region and the conventional physical downlink control channel mapped to the PDCCH region, these operations are substantially the same as those of each of the above-described embodiments in which the E-PDCCH and the PDCCH are distinguished from each other.

Programs that run on the base station and the terminal related to the present invention are programs for controlling a CPU or the like (programs for causing a computer to function) so as to implement functions of the above-described embodiments related to the present invention. Information handled by these devices is temporarily accumulated in a RAM during processing, and thereafter is stored on various types of ROM or HDD, and is read out and modified/written by the CPU as needed. A recording medium storing the programs may be any of a semiconductor medium (e.g., a ROM, nonvolatile memory card, or the like), an optical recording medium (e.g. a DVD, MO, MD, CD, BD, or the like), or a magnetic recording medium (e.g. a magnetic tape, flexible disk, or the like). The functions of the above-described embodiments of the present invention may be implemented not only through execution of the loaded programs but also through cooperative processing with the operating system, another application program, or the like, in accordance with instructions contained in the programs.

Also, in the case of distribution into the market, the programs may be distributed by being stored on a portable recording medium, or by being transferred to a server computer connected via a network such as the Internet. In this case, a storage device of the server computer is also encompassed by the present invention. Part or the entirety of the base station and the terminal according to the above-described embodiments may be typically implemented as an LSI which is an integrated circuit. Functional blocks of the base station and the terminal may be individually formed as chips or some or all of them may be integrated into a chip. A method for integration may be a dedicated circuit or a general-purpose processor, as well as an LSI. In a case where the progress of semiconductor technologies produces an integration technology which replaces an LSI, an integrated circuit based on the technology can be used.

While the embodiments of this invention have been described in detail above with reference to the drawings, the specific configurations are not limited to the embodiments, and design modifications or the like within the scope not departing from the gist of this invention are also encompassed by the present invention. Also, the present invention can be variously modified within the scope of the claims, embodiments obtained by appropriately using technical means disclosed in different embodiments in combination are within the technical scope of the present invention. Further, configurations in which elements described in each of the above-described embodiments and provide the similar benefits are interchanged are also encompassed.

INDUSTRIAL APPLICABILITY

The present invention is suitably used in a wireless base station device, a wireless terminal device, a wireless communications system, and a wireless communications method.

DESCRIPTION OF REFERENCE NUMERALS

101: base station
102: terminal
103: enhanced physical downlink control channel
104: downlink transmission data
401: codeword generation unit
402: downlink subframe generation unit
403: physical downlink control channel generation unit
404: OFDM signal transmission unit
405, 509: transmit antenna
406, 501: receive antenna
407: SC-FDMA signal reception unit
408: uplink subframe processing unit
409, 506: higher layer
502: OFDM signal reception unit
503: downlink subframe processing unit
504: physical downlink control channel extraction unit
505: codeword extraction unit
507: uplink subframe generation unit 508: SC-FDMA signal transmission unit
1801: base station
1802: terminal
1803: physical downlink control channel
1804: downlink transmission data

The invention claimed is:

1. A terminal device configured to perform communication with a base station device, the terminal device comprising:
   downlink control channel detection circuitry configured to monitor a physical downlink control channel and an enhanced physical downlink control channel; and
   higher-layer control information acquisition circuitry configured to acquire information indicating an enhanced physical downlink control channel region for monitoring the enhanced physical downlink control channel and information indicating whether the enhanced physical downlink control channel region is for localized transmission or for distributed transmission, wherein
   the enhanced physical downlink control channel region is composed of a plurality of resource block pairs,
   each of the plurality of resource block pairs includes a plurality of sets of first resource elements,
   an enhanced physical downlink control channel element is constituted by K sets of first resource elements,
   K is a natural number larger than 1,
   the enhanced physical downlink control channel is transmitted using one or more enhanced physical downlink control channel elements,
   K sets of enhanced physical downlink control channel elements for localized transmission correspond to K sets of enhanced physical downlink control channel elements for distributed transmission,
   each of the K sets of enhanced physical downlink control channel elements for localized transmission is mapped in one resource block pair, and
   each of the K sets of enhanced physical downlink control channel elements for distributed transmission are mapped in more than one resource block pairs.

2. The terminal device according to claim 1, wherein in a case where the enhanced physical downlink control channel region is for distributed transmission, one enhanced physical downlink control channel element corresponds to a plurality of sets of first resource elements included in at least two sets of second resource elements.

3. The terminal device according to claim 1, wherein the higher-layer control information acquisition circuitry configured to acquire information which indicates two enhanced physical downlink control channel regions.

4. The terminal device according to claim 1, wherein the K sets of first resource elements that constitute the set of second resource elements are included in one resource block pair.

5. A base station device configured to perform communication with a terminal device, the base station device comprising:
   downlink control channel transmission circuitry configured to transmit a physical downlink control channel and an enhanced physical downlink control channel; and
   higher-layer control information notification circuitry configured to notify the terminal device of information indicating an enhanced physical downlink control channel region for the terminal device's monitoring of the enhanced physical downlink control channel and information indicating whether the enhanced physical downlink control channel region is for localized transmission or distributed transmission, wherein
   the enhanced physical downlink control channel region is composed of a plurality of resource block pairs,
   each of the plurality of resource block pairs includes a plurality of sets of first resource elements,
   an enhanced physical downlink control channel element is constituted by K sets of first resource elements,
   K is a natural number larger than 1,
   the enhanced physical downlink control channel is transmitted using one or more enhanced physical downlink control channel elements,
   K sets of enhanced physical downlink control channel elements for localized transmission correspond to K sets of enhanced physical downlink control channel elements for distributed transmission,
   each of the K sets of enhanced physical downlink control channel elements for localized transmission is mapped in one resource block pair, and
   each of the K sets of enhanced physical downlink control channel elements for distributed transmission are mapped in more than one resource block pairs.

6. The base station device according to claim 5, wherein in a case where the enhanced physical downlink control channel region is for distributed transmission, one enhanced physical downlink control channel element corresponds to a plurality of sets of first resource elements included in at least two sets of second resource elements.

7. The base station device according to claim 5, wherein the higher-layer control information notification circuitry notifies the terminal device of information which indicates two enhanced physical downlink control channel regions.

8. The base station device according to claim 5, wherein the K sets of first resource elements that constitute the set of second resource elements are included in one resource block pair.

9. A communications method for a terminal device configured to perform communication with a base station device, the communications method comprising:
   monitoring a physical downlink control channel and an enhanced physical downlink control channel; and
   acquiring information indicating an enhanced physical downlink control channel region for monitoring the enhanced physical downlink control channel and information indicating whether the enhanced physical downlink control channel region is for localized transmission or distributed transmission, wherein
   the enhanced physical downlink control channel region is composed of a plurality of resource block pairs,
   each of the plurality of resource block pairs includes a plurality of sets of first resource elements,
   an enhanced physical downlink control channel element is constituted by K sets of first resource elements,
   K is a natural number larger than 1,
   the enhanced physical downlink control channel is transmitted using one or more enhanced physical downlink control channel elements,
   K sets of enhanced physical downlink control channel elements for localized transmission correspond to K sets of enhanced physical downlink control channel elements for distributed transmission,
   each of the K sets of enhanced physical downlink control channel elements for localized transmission is mapped in one resource block pair, and
   each of the K sets of enhanced physical downlink control channel elements for distributed transmission are mapped in more than one resource block pairs.

10. A communications method for a base station device configured to perform communication with a terminal device, the communications method comprising:

transmitting a physical downlink control channel and an enhanced physical downlink control channel; and notifying the terminal device of information indicating an enhanced physical downlink control channel region for the terminal device's monitoring of the enhanced physical downlink control channel and information indicating whether the enhanced physical downlink control channel region is for localized transmission or distributed transmission, wherein the enhanced physical downlink control channel region is composed of a plurality of resource block pairs, each of the plurality of resource block pairs includes a plurality of sets of first resource elements, an enhanced physical downlink control channel element is constituted by K sets of first resource elements, K is a natural number larger than 1, the enhanced physical downlink control channel is transmitted using one or more enhanced physical downlink control channel elements, K sets of enhanced physical downlink control channel elements for localized transmission correspond to K sets of enhanced physical downlink control channel elements for distributed transmission, each of the K sets of enhanced physical downlink control channel elements for localized transmission is mapped in one resource block pair, and each of the K sets of enhanced physical downlink control channel elements for distributed transmission are mapped in more than one resource block pairs.

* * * * *